US012348332B2

(12) United States Patent
Fukuda

(10) Patent No.: US 12,348,332 B2
(45) Date of Patent: Jul. 1, 2025

(54) MASTER DEVICE, ARITHMETIC PROCESSING DEVICE, PROGRAMMABLE LOGIC CONTROLLER, NETWORK, AND METHOD

(71) Applicant: OMRON Corporation, Kyoto (JP)

(72) Inventor: Yasunori Fukuda, Kyoto (JP)

(73) Assignee: OMTON Corporation, Kyoto (JP)

( * ) Notice: Subject to any disclaimer, the term of this patent is extended or adjusted under 35 U.S.C. 154(b) by 623 days.

(21) Appl. No.: 17/635,381

(22) PCT Filed: Mar. 4, 2020

(86) PCT No.: PCT/JP2020/009127
§ 371 (c)(1),
(2) Date: Feb. 15, 2022

(87) PCT Pub. No.: WO2021/044652
PCT Pub. Date: Mar. 11, 2021

(65) Prior Publication Data
US 2022/0400031 A1 Dec. 15, 2022

(30) Foreign Application Priority Data
Sep. 5, 2019 (JP) ................................ 2019-162181

(51) Int. Cl.
*H04L 12/437* (2006.01)
*H04L 12/413* (2006.01)
(Continued)

(52) U.S. Cl.
CPC .......... *H04L 12/437* (2013.01); *H04L 12/423* (2013.01); *H04L 12/422* (2013.01)

(58) Field of Classification Search
CPC .... H04L 12/437; H04L 12/423; H04L 12/422
See application file for complete search history.

(56) References Cited

U.S. PATENT DOCUMENTS 8,072,999 B1 12/2011 Cline et al.
9,148,297 B2 * 9/2015 Maruyama ........ H04L 12/40176
(Continued)

FOREIGN PATENT DOCUMENTS

CN 1258977 7/2000
CN 102594582 7/2012
(Continued)

OTHER PUBLICATIONS

"International Search Report (Form PCT/ISA/210) of PCT/JP2020/009127", mailed on Jun. 16, 2020, with English translation thereof, pp. 1-4.
(Continued)

*Primary Examiner* — Faruk Hamza
*Assistant Examiner* — Aixa A Guadalupe Cruz
(74) *Attorney, Agent, or Firm* — JCIPRNET

(57) ABSTRACT

A plurality of slaves include a first slave constituting the start and end points of a ring wiring and a plurality of second slaves connected between the start and end points, the ring wiring being capable of configuring a first path via which the second slaves cause data accepted from the start point side to be cyclically transferred to the end point side, and a second path for each slave to loop back the data from the device itself when the path between the slave and an adjacent slave is disconnected. When the path is recovered from the disconnection, a master transmits a command for switching the second path to the first path to the slave that carries out the loopback, and sends out data after the elapse of a time based on a propagation delay time from the time of this transmission.

13 Claims, 33 Drawing Sheets

(51) Int. Cl.
*H04L 12/423* (2006.01)
*H04L 12/42* (2006.01)

(56) References Cited

U.S. PATENT DOCUMENTS

| | | | | |
|---|---|---|---|---|
| 2014/0233372 | A1* | 8/2014 | Edmiston | H04L 12/40019 370/225 |
| 2015/0172220 | A1* | 6/2015 | Rahamim | H04L 12/422 370/389 |
| 2015/0293871 | A1* | 10/2015 | Rahamim | G06F 13/24 710/106 |

FOREIGN PATENT DOCUMENTS

| | | |
|---|---|---|
| JP | 2010062861 | 3/2010 |
| JP | 2012034080 | 2/2012 |
| JP | 5077153 | 11/2012 |
| JP | 2016119616 | 6/2016 |

OTHER PUBLICATIONS

"Written Opinion of the International Searching Authority (Form PCT/ISA/237) of PCT/JP2020/009127", mailed on Jun. 16, 2020, with English translation thereof, pp. 1-6.
"Office Action of China Counterpart Application" with English translation thereof, issued on Dec. 9, 2022, p. 1-p. 18.
"Search Report of Europe Counterpart Application", issued on Jul. 11, 2023, pp. 1-10.

* cited by examiner

MASTER DEVICE, ARITHMETIC PROCESSING DEVICE, PROGRAMMABLE LOGIC CONTROLLER, NETWORK, AND METHOD

CROSS-REFERENCE TO RELATED APPLICATION

This application is a 371 application of the International PCT application serial no. PCT/JP2020/009127, filed on Mar. 4, 2020, which claims the priority benefits of Japan Patent Application No. 2019-162181, filed on Sep. 5, 2019. The entirety of each of the above-mentioned patent applications is hereby incorporated by reference herein and made a part of this specification.

TECHNICAL FIELD

The present disclosure relates to a master device, an arithmetic processing device, a programmable logic controller, a network, and a method.

BACKGROUND ART

In the related art, networks configured by masters and slaves are known. For example, line topologies (daisy chains), tree topologies, ring topologies, and the like are known as such networks. As a ring topology, for example, a ring network system also disclosed in Patent Literature 1 (Japanese Patent Laid-Open No. 2016-119616) was proposed.

CITATION LIST

Patent Literature

Patent Literature 1

Japanese Patent Laid-Open No. 2016-119616

SUMMARY OF INVENTION

Problem to be Solved

As one connection form of the ring topology, a so-called junction redundancy ring wiring in which a plurality of slaves are connected by a ring wiring in a ring form and one of the plurality of slaves operates as a junction (divergence) constituting a start or end point of data transfer was proposed.

In the junction redundancy ring wiring, data transmitted from the start point of the master normally returns to the end point of the master via the plurality of slaves. When the wiring is disconnected, a slave at a disconnected portion performs loopback (return transfer). The inventors have attained the knowledge that looped-back data is circulated in a ring wiring, when a disconnected portion is reconnected subsequently, thereafter cyclic data can be returned to the master when a wiring is disconnected again, and the returned cyclic data is erroneously input in the master.

An objective of the present disclosure is to provide a master device, an arithmetic processing device, a programmable logic controller, a network, and a method capable of suppressing occurrence of cyclic data in a ring wiring.

Solution to Problem

According to an aspect of the present disclosure, there is provided a master device that manages a plurality of slave devices connected to a ring wiring. The plurality of slave devices include a first slave device constituting a start point and an end point of the ring wiring and a plurality of second slave devices connected between the start point and the end point of the first slave device. The ring wiring is capable of configuring a first path via which each of the second slave devices receives data accepted from a start point side and cyclically transfers the accepted data to an end point side and a second path via which each of the plurality of slave devices loops back the data from the self-slave device when a path between the self-slave device and an adjacent slave device is disconnected. The master device includes an instruction means for transmitting an instruction to switch the second path to the first path to the slave device performing the loopback when the path is recovered from the disconnection. The master device sends out data to the ring wiring after elapse of a time based on a propagation delay time of the ring wiring from the time of the transmission of the instruction.

According to the above-described aspect of the present disclosure, when the ring wiring is recovered from the disconnection, the master device expects a required time until the instruction arrives at the corresponding slaves in the ring wiring, the instruction is performed, and thus the second path of the loopback is completely switched to the first path, from the time based on the propagation delay time. The master can send out the new data to the ring wiring at a timing at which the expected time has elapsed. As a result, the sent new data can be transferred via the first path, and thus it is possible to inhibit occurrence of reverse cyclic data circulated in the loopback direction in the ring wiring.

In the above-described aspect of the present disclosure, each of the slave devices has a first port and a second port to which a path connected to an adjacent slave device is connected. When the first path is configured, each of the second slave devices receives the data accepted from the start point side with the first port and transfers the accepted data from the second port to the end point side. The instruction includes an opening instruction for enabling data to be received from the detected first port and an opening instruction for enabling data to be received from the second port. The instruction means differently sets a transmission order of the opening instruction of the first port and the opening instruction of the second port in accordance with a position of the disconnected path on the ring wiring.

According to the above-described aspect of the present disclosure, when the master transmits the opening instruction for enabling the data to be received from the first port and the opening instruction for enabling the data to be received from the second port as an instructions to the slaves having the first and second port connected to the disconnected path, the transmission order of the instructions can be set differently in accordance with the position of the disconnected path on the ring wiring.

In the above-described aspect of the present disclosure, the master device further includes a means for detecting the first port and the second port of a slave device to which a disconnected path is connected based on communication between the master device and the plurality of slave devices.

According to the above-described aspect of the present disclosure, when the instruction is transmitted, the master device can detect the first and second ports of the slaves at which the disconnected path is connected based on the communication between the master device and the plurality of slave devices.

In the above-described aspect of the present disclosure, the data may include a code indicating whether the data is changed from the loopback to the cyclic transfer. The master device may detect data of which the code indicates the change among pieces of data accepted from the ring wiring and discard the detected data.

According to the above-described aspect of the present disclosure, when the path is recovered from the disconnection, the master device can detect (extract) the data changed from the loopback transfer to the cyclic transfer from pieces of data arriving at the master device based on the change in the code of the data, and can discard the detected data.

In the above-described aspect of the present disclosure, the master device sends out data while allocating a generation to the data. When the instruction is transmitted, the master device subsequently changes the generation allocated to the data from a generation allocated before the transmission of the instruction. The master device detects data allocated with a generation different from the generation currently allocated to data among pieces of data accepted from the ring wiring and discards the detected data.

According to the above-described aspect of the present disclosure, the master device changes the generation allocated to the data to be sent out to the ring wiring before and after the instruction is transmitted when the path is recovered from the disconnection. Thus, the master device can detect the data changed from the loopback to the cyclic transfer at the time of transmission of the instruction among the data arriving at the master device based on the allocated generation and can discard the detected data.

In the above-described aspect of the present disclosure, the master device outputs a notification indicating that a change in data from loopback transfer to cyclic transfer occurs.

According to the above-described aspect of the present disclosure, the notification indicating the change in the data from the loopback transfer to the cyclic transfer, that is, the cyclic transfer in the reverse direction occurs, can be output to the user.

In the above-described aspect of the present disclosure, the ring wiring includes an EtherCAT (registered trademark) network.

According to the above-described aspect of the present disclosure, the configuration of the foregoing master device can be applied to the EtherCAT network.

There is provided an arithmetic processing device including the master device according to the above-described aspect of the present disclosure, There is provided a programmable logic controller including the arithmetic processing device according to the above-described aspect of the present disclosure.

According to another aspect of the present disclosure, there is provided a network including a ring wiring. The network includes: a plurality of slave devices connected to the ring wiring; and a master device configured to manage the plurality of slave devices. The plurality of slave devices include a first slave device constituting a start point and an end point of the ring wiring and a plurality of second slave devices connected between the start point and the end point of the first slave device. The ring wiring is capable of configuring a first path via which each of the second slave devices receives data accepted from a start point side and cyclically transfers the accepted data to an end point side and a second path via which each of the plurality of slave devices loops back the data from the self-slave device when a path between the self-slave device and an adjacent slave device is disconnected. The master device includes an instruction means for transmitting an instruction to switch the second path to the first path to the slave device performing the loopback when the path is recovered from the disconnection. The master device sends out data to the ring wiring after elapse of a time based on a propagation delay time of the ring wiring from the time of the transmission of the instruction.

According to the above-described present disclosure, when the path of the ring wiring is recovered from the disconnection, the master device expects a required time until the instruction arrives at the corresponding slaves in the ring wiring, the instruction is performed by the slaves, and thus the second path of the loopback is completely switched to the first path, as the time based on the propagation delay time. The master can send out the new data to the ring wiring at a timing at which the expected time has elapsed. As a result, the sent new data can be transferred via the first path, and thus it is possible to inhibit occurrence of reverse cyclic data circulated in the loopback direction in the ring wiring.

According to still another aspect of the present disclosure, there is provided a method performed by a master device that manages a plurality of slave devices connected to a ring wiring. The plurality of slave devices include a first slave device constituting a start point and an end point of the ring wiring and a plurality of second slave devices connected between the start point and the end point of the first slave device. The ring wiring is capable of configuring a first path via which each of the second slave devices receives data accepted from a start point side and cyclically transfers the accepted data to an end point side and a second path via which each of the plurality of slave devices loops back the data from the self-slave device when a path between the self-slave device and an adjacent slave device is disconnected. The method includes: a step of transmitting an instruction to switch the second path to the first path to the slave device performing the loopback when the path is recovered from the disconnection; and a step of sending out data to the ring wiring after elapse of a time based on a propagation delay time of the ring wiring from the time of the transmission of the instruction.

In the above-described aspect of the present disclosure, when performing the method and the path of the ring wiring is recovered from the disconnection, the master device expects a required time until the instruction arrives at the corresponding slaves in the ring wiring, the instruction is performed by the slaves, and thus the second path of the loopback is completely switched to the first path, as the time based on the propagation delay time. The master can send out the new data to the ring wiring at a timing at which the expected time has elapsed. As a result, the sent new data can be transferred via the first path, and thus it is possible to inhibit occurrence of reverse cyclic data circulated in the loopback direction in the ring wiring.

DESCRIPTION OF EMBODIMENTS

Figure 1:
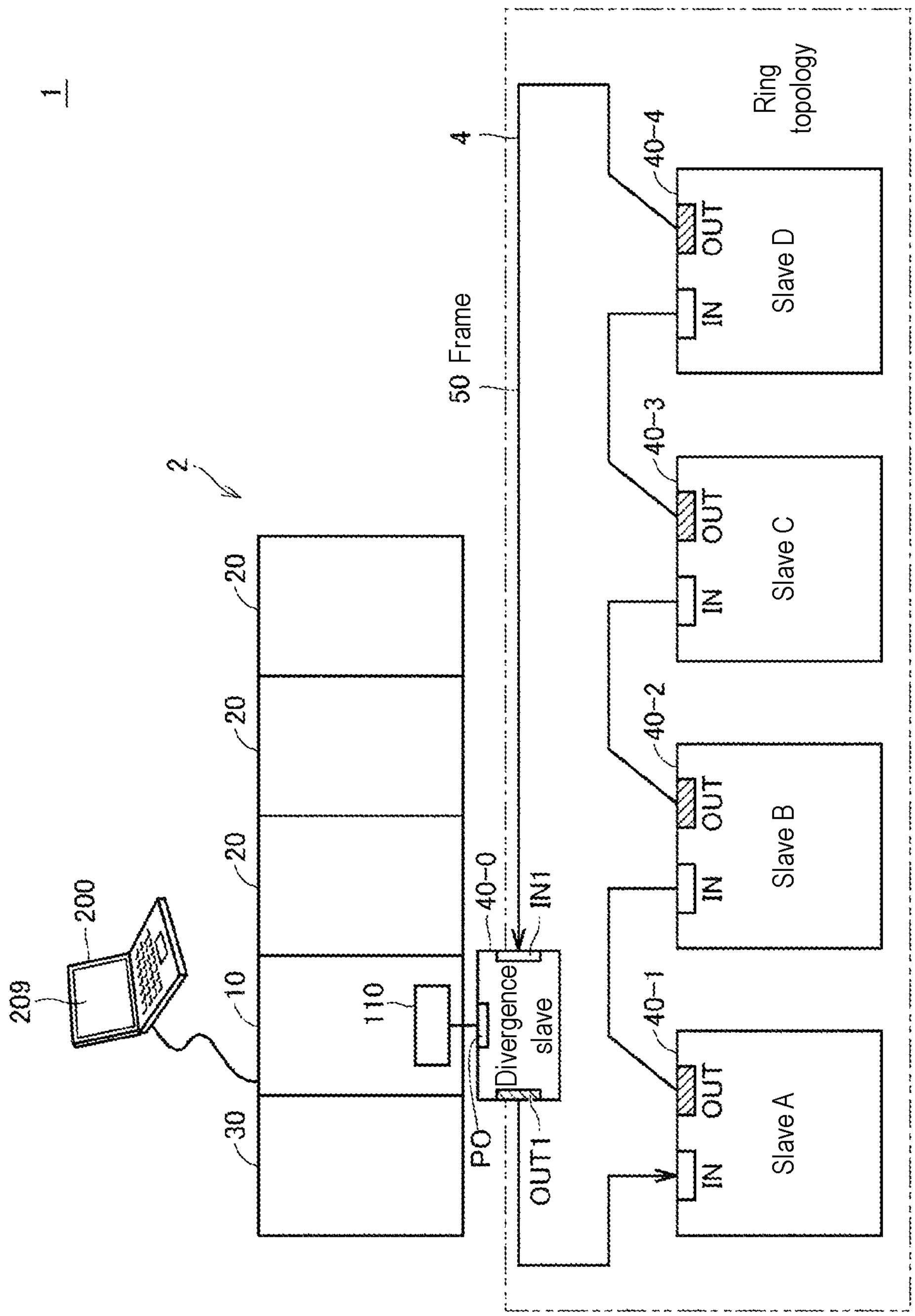
FIG. 1 is a schematic diagram illustrating an overall configuration of a PLC system according to an embodiment.

Hereinafter, an embodiment will be described with reference to the drawings. In the following description, the same reference numerals are given to the same portions and equivalent portions in the drawings.

In the embodiment, as an example of a network configuration, a case applied to a control system in which a programmable logic controller (PLC) is centered on will be exemplified. Here, in the control system, a configuration in which any of various industrial computers is centered on as well as the PLC can also be adopted. A target to which the network configuration is applied is not limited to the control system.

A. Application Example

Figure 5:
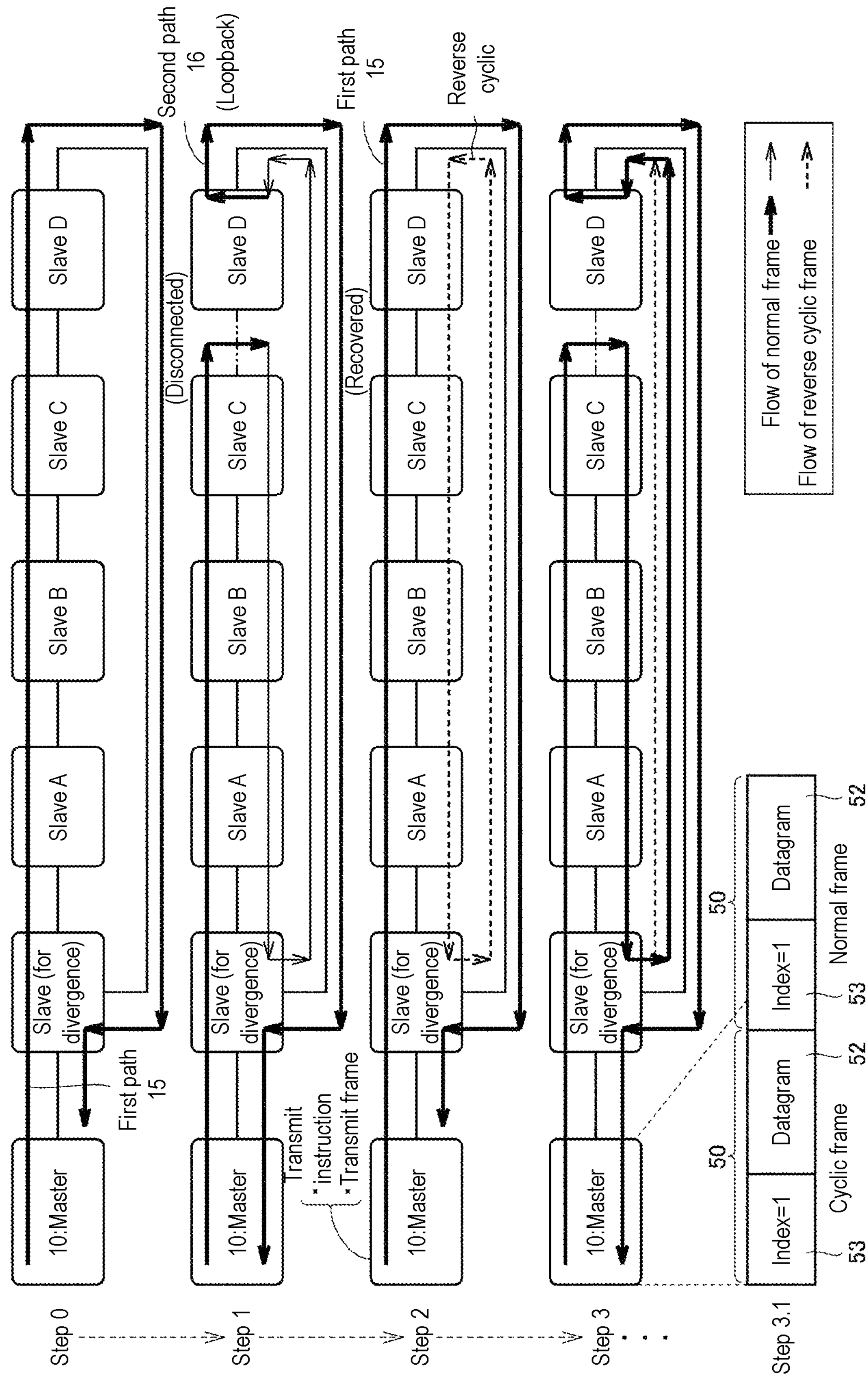
FIG. 5 is a diagram schematically illustrating an example of a change in a path of the frame in a ring topology according to the embodiment.

An example of a scene to which the present invention is applied will be described. Referring to FIG. 5, the foregoing control system includes, for example, a master 10 that manages a plurality of slaves connected to a ring wiring configuring a field network. For example, EtherCAT can be applied to the ring wiring.

The plurality of slaves include a first slave device (a divergence slave) constituting start and end points of the ring wiring and a plurality of second slave devices (slaves "A," "B," "C," and "D") connected between start and end points of the first slave device. The first slave device is equivalent to a so-called junction at which exchange of data between the master 10 and the second slave device connected to the ring wiring is implanted while causing data to diverge between the master 10 and the second slave device. The master 10 is equivalent to, for example, a PLC and the second slaves include a device connecting control targets (a sensor, a switch, a relay, and the like) provided in a field. The data includes, for example, a control instruction transmitted from the master 10 to each slave and field information transmitted from the second slave to the master 10. The data is configured in, for example, a frame format, but the present invention is not limited to the frame format.

The ring wiring is capable of configuring a first path 15 (Step0 of FIG. 5) via which each of the second slave devices receives data accepted from the start point side and transfer the received data to the end point side and a second path 16 (Step1 of FIG. 5) via which each of the plurality of slave devices transfer data from the self-slave device in a loop-back manner when a path between the slave device and an adjacent slave device is disconnected. In this way, the ring wiring can configure a junction redundancy ring topology in which the first path 15 and the second path 16 can be configured redundantly.

When the disconnected portion of the path is connected and the path is recovered from the disconnection (Step2 of FIG. 5), the master 10 transmits an instruction (a command) to switch the second path 16 to the original first path 15 to the slave devices performing loopback transfer. In Step1, the slave "C" and the slave "D" performing the loopback transfer receive the instruction and perform the received instruction. When the instruction is performed, for example, input/output ports of the slave "C" and the slave "D" connected to the recovered path are opened. Further, the master 10 transmits new data to the ring wiring after a predetermined time based on a propagation delay time of the ring wiring from the time of transmission of the instruction to the ring wiring elapses. Thus, the new data can be inhibited from becoming reverse cyclic data to be described below in the ring wiring.

According to the present disclosure, the disconnection and connection of the ring wiring are assumed to be physical events such as disconnection and connection of a cable, but disconnection and connection events are not limited to events in a physical layer. For example, the present disclosure can be applied even when a logical disconnection or connection event in a higher layer (for example, a connection layer) of the physical layer occurs.

Here, occurrence of reverse cyclic data will be described. When a disconnected portion of a path is connected and the path is recovered from the disconnection, as described above, loopback is not performed in the slave "C" and the slave "D" and the data transferred in the loopback manner at the time of disconnection of the path starts to be circulated in the ring wiring (Step2 of FIG. 5). Since a direction of this circulation is reverse to a direction in which the data flows at the normal time at which the path is not disconnected (Step0 of FIG. 5), this circulation is also referred to as "reverse circulation" (Step2 of FIG. 5). The reverse cyclic data does not arrive at the master 10.

When the path connected in Step2 is disconnected subsequently (Step3 of FIG. 5), the second path 16 is configured again the ring wiring and the reverse cyclic data arrives at the master 10 via the second path 16 (Step3 of FIG. 5). In the master 10, the reverse cyclic data can be erroneously input.

According to the present disclosure, new data is transmitted to the ring wiring after elapse of a predetermined time based on the propagation delay time of the ring wiring from the time of transmission of the instruction to the ring wiring, for example, after elapse of a predetermined time based on a propagation delay time until the instruction arrives at the corresponding slave devices (for example, the slave "C" and the slave "D") via the ring wiring.

In this way, when the path of the ring wiring is recovered from the disconnection, the master 10 expects a required time until the instruction arrives at the corresponding slaves in the ring wiring, the arriving instruction is performed by the slaves, and thus the second path 16 of the loopback is completely switched to the first path 15, as the time based on the propagation delay time. The master 10 can send out the new data to the ring wiring at a timing at which the expected time has elapsed. As a result, the sent new data can be transferred via the first path 15, and thus it is possible to inhibit occurrence of reverse cyclic data circulated in the loopback direction in the ring wiring.

Hereinafter, a more specific application example of the embodiment will be described.

<B. Overall Configuration of PLC System>

First, an overall configuration of the PLC system 1 according to the embodiment which is a mode of the control system will be described. FIG. 1 is a schematic diagram illustrating an overall configuration of the PLC system 1 according to an embodiment.

Referring to FIG. 1, the PLC system 1 is a control system that controls a target and is an example of a system to which a network according to the present disclosure is applied. The PLC system 1 includes a main processing device 2 and slaves 40-0, 40-1, 40-2, 40-3, and 40-4 which are a plurality of remote devices. The main processing device 2 and the slaves 40-0, 40-1, 40-2, 40-3, and 40-4 are devices that constitute at least part of the PLC system 1 and are connected via a network 4.

As the network 4, for example, a bus or a network in which an arrival time of data is guaranteed in accordance with a time-sensitive network (TSN) standard and given periodic communication is performed is preferably adopted. For example, a network related to a known protocol such as EtherCAT which is an example of a machine control network or EtherNet/IP (registered trademark) which is an industrial open network in which a control protocol is mounted on a general Ethernet (registered trademark) may be adopted.

The main processing device 2 execute programs necessary to control a target (including a user program and a system program) to implement a process of collecting an input signal (hereinafter referred to as "field information") from an external switch or sensor (not illustrated) or the like, a process of performing control calculation based on the collected field information, a process of giving an instruction value calculated by the control calculation to a control target such as an external relay or actuator or the like.

The main processing device 2 is equivalent to the PLC and includes a processor unit 10 serving as an arithmetic processing device including a central processing unit (CPU), one or more IO units 20 performing input and output operations, and a power unit 30 as a device configuration. The processor unit 10 and the IO unit 20 are connected to be able to perform data communication with each other via an internal bus (not illustrated). The power unit 30 supplies power of an appropriate voltage to the processor unit 10 and the IO unit 20.

The processor unit 10 includes an arithmetic part that executes a program necessary to control a target and a communication controller 110 equivalent to a communication processing part that controls communication with the slaves 40-0, 40-1, 40-2, 40-3, and 40-4 via the network 4. The communication via the network 4 is autonomously controlled by the main processing device 2. Specifically, the processor unit 10 sends out data to be transferred in sequence on the network 4 at a period based on a timer 115 to be described below, at a predetermined timing, or in accordance with rules. In the following description, the data to be transferred in sequence on the network 4 is referred to as a "frame." In terms of the meaning, the processor unit 10 is referred to as the "master 10" that manages the slaves 40-0, 40-1, 40-2, 40-3, and 40-4. The slaves 40-0, 40-1, 40-2, 40-3, and 40-4 have basically similar configurations. Therefore, when configurations common to these slaves are described, the slaves are collectively referred to as the "slaves 40." In the PLC system 1 of FIG. 1, four slaves 40-0, 40-1, 40-2, 40-3, and 40-4 are provided, but the number of slaves is not limited to four.

The slave 40 receives the field information from a field device such as an external switch or sensor or the like and transmits the received field information to the master 10 via the network 4. Besides, the slave 40 outputs an instruction value received from the master 10 via the network 4 to the field device of the external relay or actuator. Alternatively, the slave 40 may operate by itself in accordance with the instruction value received via the network 4. For example, as the slave 40, a device that includes a simple IO unit that does not have an arithmetic function, an IO unit that has an arithmetic function, and an actuator such as a motion controller is assumed.

The communication controller 110 of the master 10 is configured to manage transmission of a data string (in the embodiment, equivalent to a "frame 50") including data handled by the main processing device 2 and one or more slaves 40 on the network 4.

As illustrated in FIG. 1, a network (network system) is configured by the master 10 and the plurality of slaves 40. The master 10 manages the plurality of slaves 40-0 to 40-4 configuring a network including a ring topology. The master 10 is connected to a support device 200 which is an external information processing device so that communication is possible. The support device 200 includes a display 209.

To describe the ring topology, the slave 40-0 is referred to as the divergence slave 40-0 and the slaves 40-1 to 40-4 are also referred to as the slaves "A," "B," "C," and "D," respectively. In FIG. 1, as ports of each slave, an input port IN through which the frame 50 is mainly accepted and an output port OUT through which the frame 50 is mainly sent out on the network 4 are illustrated.

The divergence slave 40-0 is a slave constituting start and end points of the ring topology and is a slave forming the ring topology. The slaves "A," "B," "C," and "D" are connected in this order in a daisy chain and a slave group connected in the daisy chain is connected between a port OUT1 and a port IN1 respectively corresponding to the start and end points of the divergence slave 40-0. Further, the master 10 is connected to an input port PO of the divergence slave 40-0.

The port OUT1 and the port IN1 of the divergence slave 40-0 are respectively connected to the input port IN of the slave "A" and the output port OUT of the slave "D." In the slave group connected in the daisy chain, the output port OUT of each slave 40 is connected to the input port IN of the adjacent slave 40. Thus, the frame 50 sent out from the master 10 to the network 4 passes through the divergence slave 40-0, passes through each slave 40 connected in the daisy chain, passes through the divergence slave 40-0, and subsequently returns to the master 10. Accordingly, the master 10 can exchange data (an instruction value and field information) with each slave 40 through the frame 50 circulated in the ring topology.

Hereinafter, an "IN-OUT relation" is defined between two slaves 40 connected to each other by a cable of the network 4. Specifically, a data input from the output port OUT of one slave 40 to the input port IN of the other slave 40 is also referred to as an "input from OUT to IN." Of two slaves 40 connected to each other by a cable, a data input from the input port IN of one slave 40 to the output port OUT of the other slave 40 is also referred to as an "input from IN to OUT" below.

<C. Hardware Configuration of Processor Unit 10>

Figure 2:
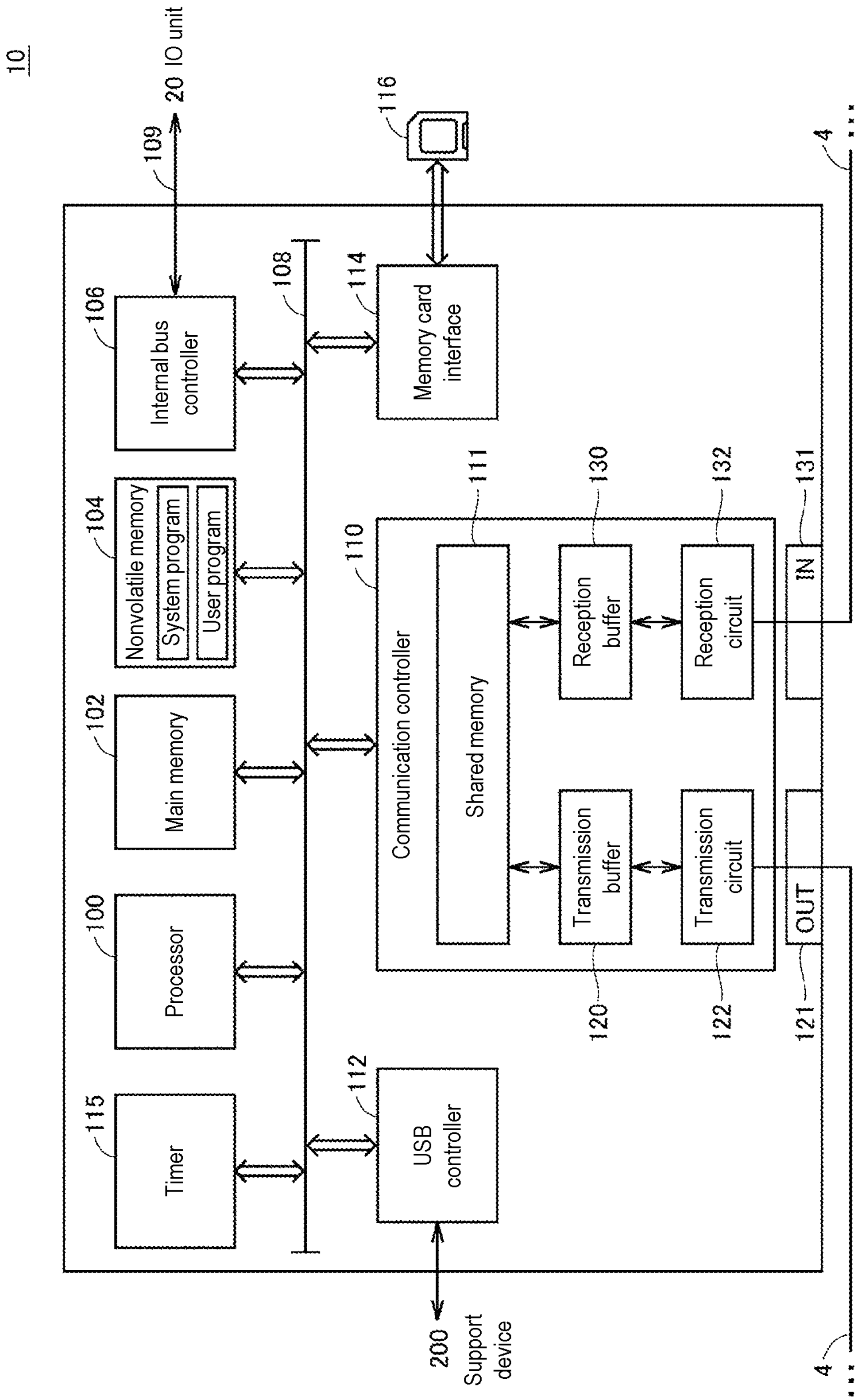
FIG. 2 is a schematic diagram illustrating a hardware configuration of a processor unit included in the PLC system according to the embodiment.

FIG. 2 is a schematic diagram illustrating a hardware configuration of the processor unit 10 included in the PLC system 1 according to the embodiment. A device configuration of the master 10 (that is, the processor unit 10) according to the embodiment will be described with reference to FIG. 2.

Referring to FIG. 2, the master 10 includes, in addition to a communication controller 110 which is a communication processing part, a processor 100 which is an arithmetic part, a main memory 102 which is an example of a main storage device, a nonvolatile memory 104 which is an example of an auxiliary storage device, an internal bus controller 106, the timer 115, a memory card interface 114, a universal serial bus (USB) controller 112, and the communication controller 110 to which the network 4 is connected. These components are configured to be able to perform data communication with each other via an internal bus 108. The master 10 further includes an output port 121 for sending out the frame 50 to the network 4 and an input port 131 for accepting the frame 50 from the network 4. The main memory 102 is configured by a volatile storage device such as a dynamic random access memory (DRAM) or a static random access memory (SRAM). The nonvolatile memory 104 is configured by, for example, a nonvolatile storage device such as a hard disk drive (HDD) or a solid-state drive (SSD).

To facilitate description, the master 10 includes only one processor 100, but a plurality of processors may be mounted. Each processor may have a plurality of cores. In the master 10, the processor 100 periodically performs a single task or a plurality of tasks.

The processor 100 executes a program related to control. The processor 100 reads a program necessary in the nonvolatile memory 104 or the like and loads and executes the read program on the main memory 102. The program related to the control typically includes a user program and a system program.

The internal bus controller 106 is connected to the IO unit 20 via an internal bus 109 and relays exchange of data between the processor 100 and the IO unit 20.

The memory card interface 114 is configured so that the memory card 116 is detachably mounted, and data can be recorded on the memory card 116 and various kinds of data (a user program, data, or the like) can be read from the memory card 116. The user program may be loaded from the memory card 116 to the nonvolatile memory 104.

The USB controller 112 controls communication with the support device 200 and the master 10. A standard for communication with the support device 200 is not limited to the USB and various communication standards can be applied.

The communication controller 110 is connected to the slave 40 via the network 4 and relays exchange of data (an instruction, field information, or the like) between the master 10 and the slave 40. More specifically, the communication controller 110 includes a shared memory 111, a transmission buffer 120, a transmission circuit 122, a reception buffer 130, and a reception circuit 132. The transmission circuit 122 and the reception circuit 132 are respectively connected to the output port 121 and the input port 131, send out data to the network 4 via the connected ports, and receive data accepted from the network 4.

The transmission buffer 120 and the transmission circuit 122 implement a process related to frame transmission from the communication controller 110 to an external device. The reception buffer 130 and the reception circuit 132 implement a process related to frame reception from an external device to the communication controller 110. The communication controller 110 includes the shared memory 111, and thus the processor 100 directly accesses the shared memory 111 to write data (field information or the like) on the shared memory 111 and acquires data (an instruction or the like) from the shared memory 111. That is, the data written on the shared memory 111 is transferred to the transmission buffer 120 and is sent out from the transmission buffer 120 to an external device. After data acquired from an external device is received by the reception buffer 130, the data is transferred to the shared memory 111.

The communication controller 110 may implement some or all of the processes using software. Alternatively, a hardware circuit such as an application specific integrated circuit (ASIC) or a field-programmable gate array (FPGA) may be used to implement some or all of the processes.

<D. Device Configuration of Slave 40>

Figure 3:
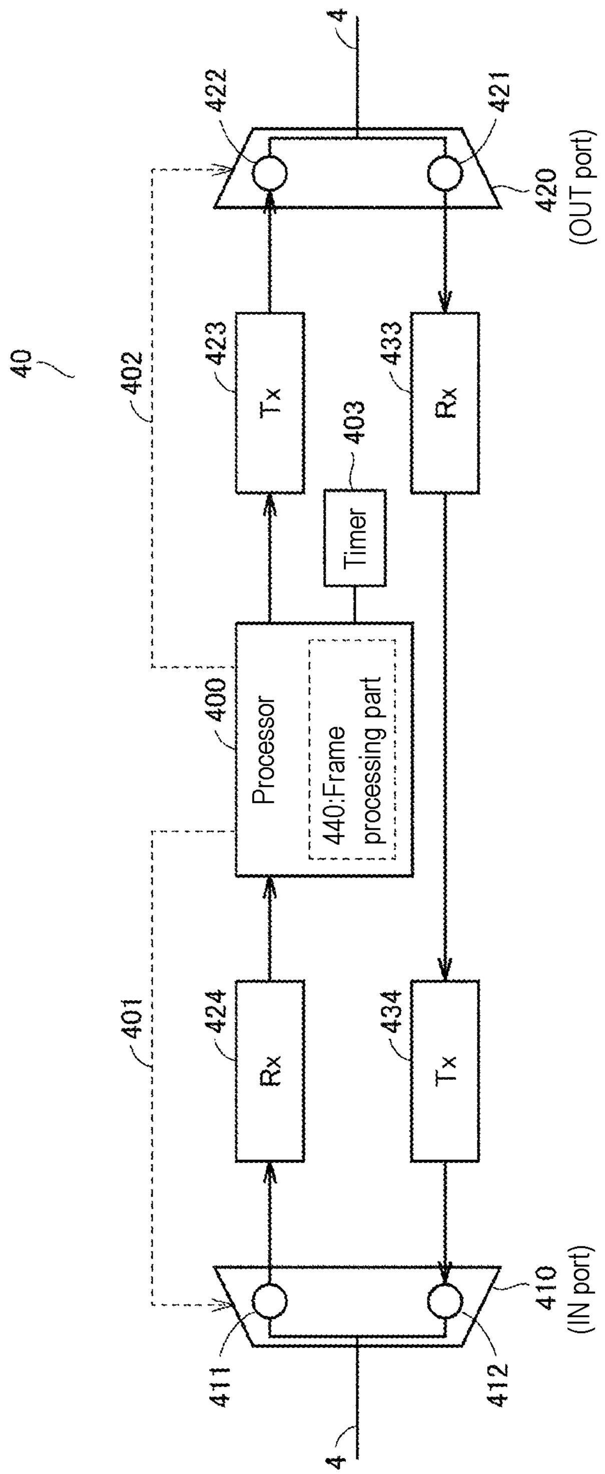
FIG. 3 is a schematic diagram illustrating a hardware configuration of a slave according to the embodiment.

FIG. 3 is a schematic diagram illustrating a hardware configuration of the slave 40 according to the embodiment.

A device configuration of the slave 40 according to the embodiment will be described with reference to FIG. 3.

Referring to FIG. 3, the slave 40 includes a processor 400, a timer 403, an input port 410, an output port 420, reception circuits (in the drawing, abbreviated to Rx) 424 and 433, and transfer circuits (in the drawing, abbreviated to Tx) 423 and 434.

The processor 400 transmits or receives data to and from the network 4 through the input port 410 or the output port 420 and performs a predetermined process on the transmitted or received data. The processor 400 implements a predetermined process including frame processing of a frame processing part 440 by executing software. The frame processing part 440 of the slave 40 (excluding the divergence slave) mainly exchanges the accepted frame 50 and data (an instruction or field information) with a field device (not illustrated). The processor 400 may implement some or all of the processes using software or a processor circuit may be used for the implementation. The circuit can include an ASIC or an FPGA.

The input port 410 includes a port 411 to which the reception circuit 424 is connected and a port 412 to which the transfer circuit 434 is connected. Similarly, the output port 420 includes a port 421 to which the reception circuit 433 is connected and a port 422 to which the transfer circuit 423 is connected. The processor 400 outputs switching signals 401 and 402 to the input port 410 and the output port 420 at a period based on the timer 403, at a predetermined timing, or in accordance with rules. The input port 410 connects one of ports 411 and 412 to the network 4 in accordance with the switching signal 401. The output port 420 connects one of ports 421 and 422 to the network 4 in accordance with the switching signal 402.

The switching signals 401 and 402 enables the foregoing "IN-OUT relation" to be dynamically completely switched between two slaves 40 connected to the network 4. Specifically, when the ports 411 and 422 are connected to the network 4, the frame 50 is transferred with the "input from OUT to IN." When the ports 412 and 421 are connected to the network 4, the frame 50 is transferred with the "input from IN to OUT."

<E. Flow of Data Between Slaves>

Figure 4:
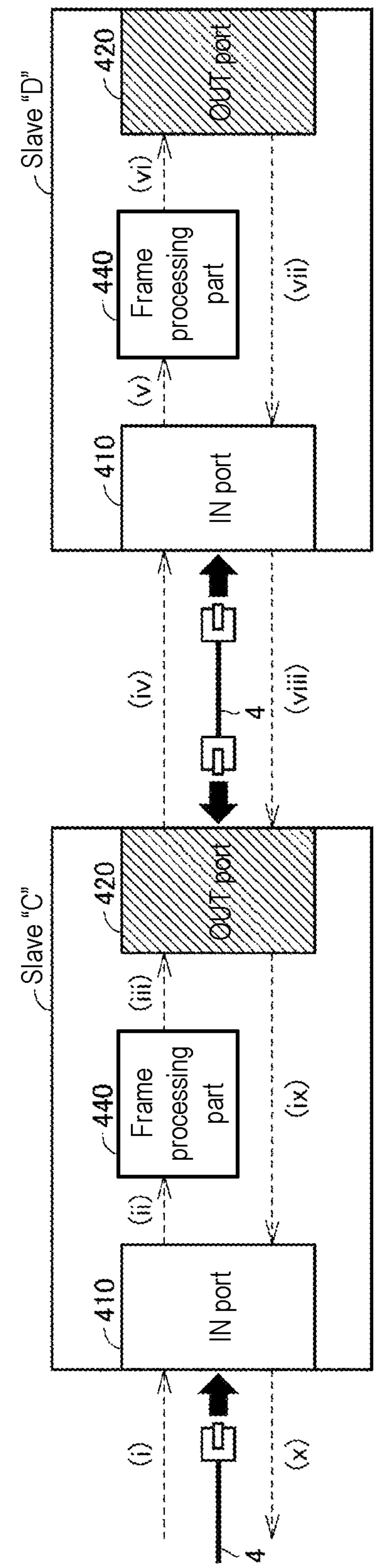
FIG. 4 is a diagram schematically illustrating an example of a flow of a frame between two slaves according to the embodiment.

FIG. 4 is a diagram schematically illustrating an example of a flow of a frame between two slaves according to the embodiment. FIG. 4 illustrates a flow of the frame 50 between any two slaves 40 adjacent in the ring topology of FIG. 1, for example, a flow of the frame 50 between the slave "C" and the slave "D." FIG. 5 is a diagram schematically illustrating an example of a change in a path of the frame 50 in the ring topology according to the embodiment.

In FIG. 4, a dashed line arrow indicates a flow (path) of the frame 50. Numbers ((i), (ii), (iii), . . . ) upper and below of the dashed line arrows denote an order of a flow (an order of a path) of the frame 50. Hereinafter, to facilitate description, when a path of number (i) is indicated when a path (i) or the like is written.

A flow of the frame 50 in a normal case in which a path of the network 4 is not disconnected and a flow of the frame 50 in a disconnection/connection case of the path of the network 4 will be described with reference to FIGS. 4 and 5. The "disconnection/connection" indicates that a path is connected after the path is disconnected.

First, the flow of the frame 50 in the normal case will be described. When the frame 50 from the master 10 is accepted from the start point side of the divergence slave 40-0 to the input port 410 of the slave "C" (see (i) of FIG. 4), the frame 50 is transmitted from the input port 410 to the frame processing part 440 (see (ii)). The frame processing part 440 receives the accepted frame 50 and performs a predetermined process on the received frame 50. Thereafter, the frame processing part 440 transmits the processed frame 50 to the output port 420 (see (iii)).

The frame 50 is transferred from the output port 420 to the slave "D" via the network 4. The frame 50 is transferred to the input port 410 of the slave "D" (see (iv)). When the frame 50 is accepted to the input port 410 of the slave "D," the input port 410 transmits the accepted frame 50 to the frame processing part 440 (see (v)). The frame processing part 440 performs a predetermined process on the received frame 50. Thereafter, the frame processing part 440 transmits the processed frame 50 to the output port 420 (see (vi)). Thereafter, the frame 50 returns to the master 10 via the divergence slave 40-0 (not illustrated) from the output port 420 of the slave "D."

In this way, at a normal time, the flow of the frame 50 between the slaves 40 is a flow in the direction in accordance with the "input from OUT to IN" (Step® of FIG. 5).

On the other hand, when the network 4 is disconnected between the slave "C" and the slave "D," the frame 50 is transferred as follows. First, in the flow of the frame 50 at the foregoing normal time, the frame processing part 440 of the slave "C" transmits the processed frame 50 to the output port 420 (see (vi)). However, when the connection with the slave "D" is disconnected, the slave "C" transmits the frame 50 from the output port 420 of the slave "C" to the input port 410 without involving the frame processing part 440 (see (ix)). In this way, when the path between the slave "C" and the slave "D" is disconnected, the slave "C" returns and transmits the frame 50. When the path of the network 4 is disconnected, the frame 50 in the slave 40 connected to the disconnected portion is returned and transferred, and thus a flow in a direction in accordance with the "input from OUT to IN" in a reverse direction to the flow of the frame 50 at the normal time can occur. In the embodiment, transferring of the frame 50 in the return direction in the slaves 40 is also referred to as "loopback" (Step1 of FIG. 5).

The frame 50 looped back in the slave "C" is transferred in the reverse direction of the slave "B"→the slave "A"→the divergence slave 40-0 (not illustrated), and thus the frame 50 is transferred to the output port 420 of the slave "D." The slave "D" returns and transfers the frame 50 accepted to the output port 420 to the divergence slave 40-0 since the path between the slave "D" and the slave "C" is disconnected. Thus, the frame 50 is returned from the divergence slave 40-0 to the master 10.

Thereafter, when the disconnected portion of the path is connected, the frame is not returned in the slave 40, that is, the frame 50 returned and transferred at the time of disconnection of the path starts to be circulated in the ring topology (see (vii), (viii), (ix), and (x)). The direction of the circulation is reverse to the direction in which the frame 50 flows at the normal time, this circulation is referred to as "reverse circulation" in the embodiment (Step2 of FIG. 5). The "reversely circulated" reverse cyclic frame 50 is transferred along a path in which the frame processing part 440 is bypassed in each slave 40. The reverse cyclic frame 50 does not arrive at the master 10. Therefore, when the reverse cyclic frame 50 occurs, the master 10 detects data losing (frame losing).

Thereafter, when the connected portion of the path is disconnected again, directions in which both the frame 50 at the normal time and the cyclic frame 50 flow are matched. Therefore, both the normal frame 50 and the cyclic frame 50 arrive at the master 10 (Step3 of FIG. 5).

(Knowledge of Inventors)

In the embodiment, the frame 50 at the normal time and the reverse cyclic frame 50 include an index 53 for identifying the frame and a datagram 52 which is a data body to be transferred, as illustrated in (B) of FIG. 6 to be described below. The master 10 adds the index 53 in a predetermined range at each predetermined period based on a control period to generate and transfer the frame 50 (Step3.1 of FIG. 5). The reverse cyclic frame 50 is highly likely to be the frame 50 at a previous period rather than a present period. However, when both the frame 50 at the present normal time and the reverse cyclic frame 50 arriving at the master 10 have the matched index 53, the master 10 cannot determine which frame is correct between both the frames 50, that is, cannot determine a frame which should be processed, which results in an erroneous operation.

The inventors have attained new knowledge that the foregoing reverse cyclic frame occurs when a path is disconnected/connected in a junction redundancy ring topology, and have found out that it is necessary to suppress occurrence of the cyclic frame 50 in order to avoid the foregoing erroneous operation under this knowledge. A process related to the suppression of the occurrence of the cyclic frame will be described below.

(Exemplary Configuration of Frame)

An exemplary configuration of a frame according to the embodiment will be described. FIG. 6 is a diagram schematically illustrating an example of a configuration of the frame according to the embodiment. The frame 50 according to the embodiment basically includes a header 51 and a datagram 52 for storing control information (see (A) of FIG. 6). In accordance with a kind of frame, information stored in the header 51 or the datagram 52 differs.

Referring to (B) of FIG. 6, in the header 51 of a frame 55 circulated and transferred to the slaves 40 of the ring topology at the normal time (hereinafter referred to as a cyclic frame 55), an index 53, a RoundTripBit 57 referred to when it is determined whether it is necessary to discard a frame, a time 571 in which RoundTripBit 57 is set, and a type 58 are stored. In a region of the datagram 52, each of data 52A, 52B, 52C, and 52D which is an instruction value or field information corresponding to each slave 40 (that is, the slave "A," the slave "B," the slave "C," and the slave "D") is stored. A message may be stored in the datagram 52. An initial value of the RoundTripBit 57 is "OFF." When the cyclic frame 55 is looped back, "ON" is set (written) by the slave 40. The type 58 indicates a kind of frame 50. In the embodiment, the kind of frame 50 includes the cyclic frame 55 at the normal time and a command frame 56 to be described below.

Figure 6:
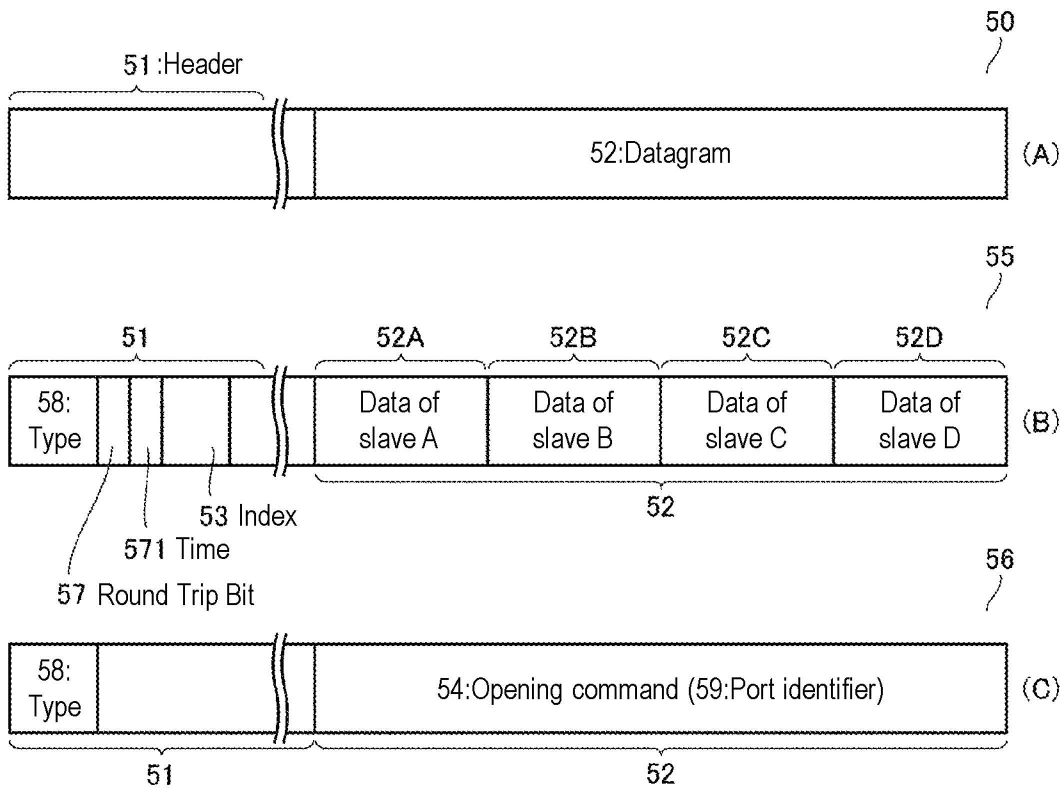
FIG. 6 is a diagram schematically illustrating an example of a configuration of the frame according to the embodiment.

(C) of FIG. 6 illustrates an example of the command frame 56. The command frame 56 stores a type 58 in the header 51 and has an opening command 54 which is an instruction to open a port as the datagram 52. The opening command 54 includes a port identifier 59 for identifying a port of the slave 40 to be opened. When it is detected based on the port identifier 59 of the accepted command frame 56 that the command frame 56 is the command frame 56 destinated for the slave 40, the slave 40 performs a process of opening the port by performing the opening command 54 of the command frame 56. The opening process includes a process of causing a state in which the port of the slave 40 is closed due to disconnection of the path of the network 4 to transition to a state in which the port is opened. More specifically, the opening process includes a process of causing the state of the slave 40 to transition to a state in which a process of transferring (transmitting and receiving) a frame via the port can be performed (an execution permission state). When the slave 40 detects that the path of the network 4 between this slave 40 and an adjacent slave 40 is disconnected, the slave 40 closes the port to which the adjacent slave 40 is connected and causes a self-state to transition to a state in which the process of transferring the frame is prohibited.

<F. Suppression of Occurrence of Cyclic Frame>

In the embodiment, when a disconnected portion between the slaves 40 in the path of the ring topology is connected again and the path is recovered from the disconnection, the master 10 transmits the command frame 56 for opening the input and output ports of the slave 40 connected to the recovered portion. When a predetermined time elapses from the time of transmission of the command frame 56 rather than immediately after the transmission, an operation of sending out (transferring) the cyclic frame 55 at the normal time to the network 4 of the ring topology is started.

(F1. Functional Configuration of Master 10)

Figure 7:
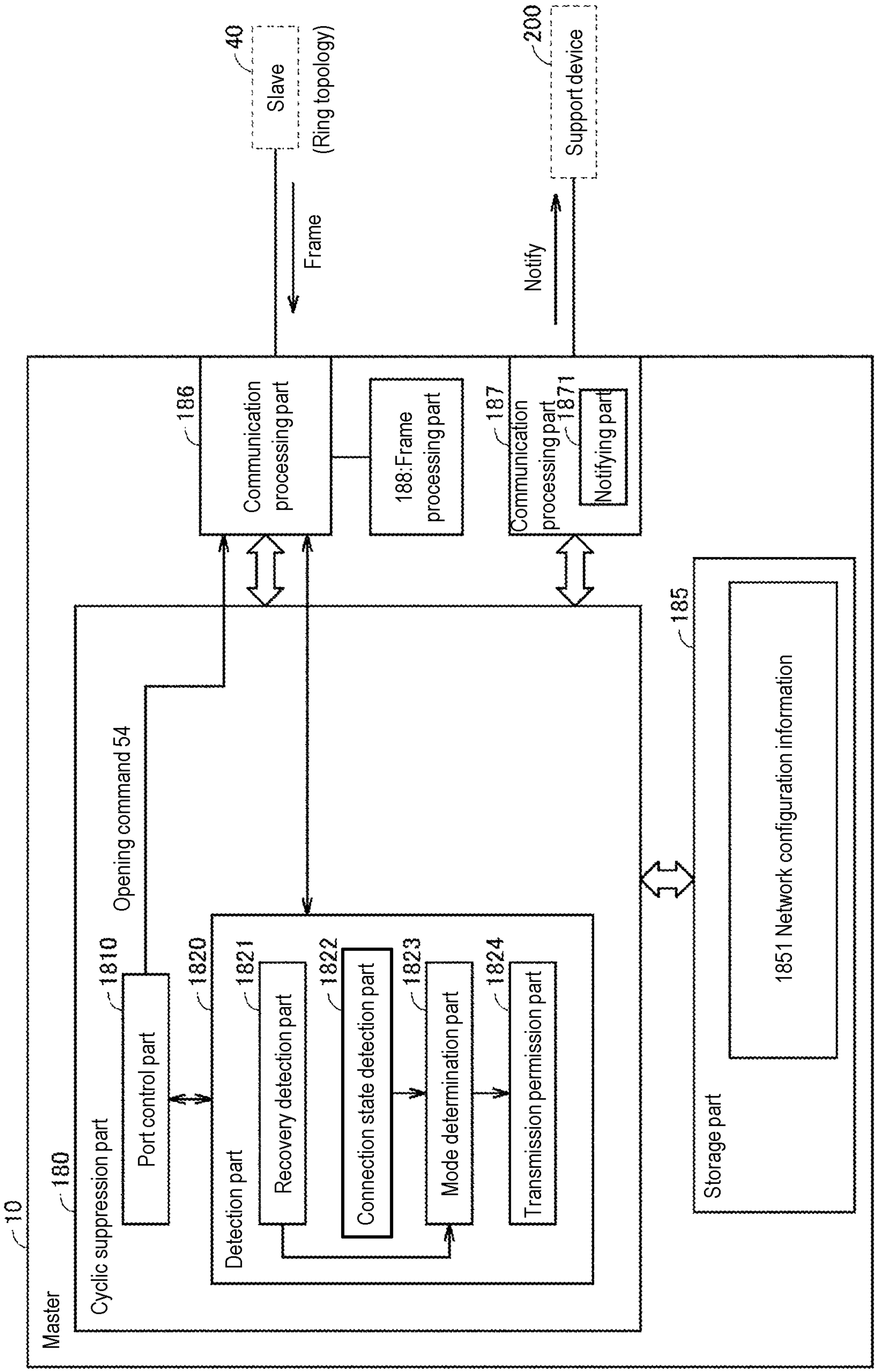
FIG. 7 is a diagram schematically illustrating an example of a functional configuration of a master according to the embodiment.

FIG. 7 is a diagram schematically illustrating an example of a functional configuration of the master 10 according to the embodiment. Referring to FIG. 7, the master 10 includes a cyclic suppression part 180 suppressing occurrence of a reverse cyclic frame, a storage part 185 corresponding to the nonvolatile memory 104, communication processing parts 186 and 187, and a frame processing part 188. The communication processing part 187 includes a notifying part 1871 that outputs a notification indicating a possibility of occurrence of a reverse cyclic frame.

The storage part 185 includes network configuration information 1851. The network configuration information 1851 is generated in advance, for example, by a user in the support device 200 and the generated network configuration information 1851 is transferred to the master 10. The network configuration information 1851 includes information indicating a connection relation between the master 10 and the slaves 40 and a connection relation between the slaves 40 connected to the network 4 of the ring topology. The information indicating the connection relations includes information for identifying the input and output ports connected along a path between the master 10 and the slaves 40 and information for identifying the input and output ports connected via a path between the adjacent slaves 40.

The frame processing part 188 exchanges a frame at the normal time with the slave 40 via the communication processing part 186. The frame processing part 188 generates the cyclic frame 55 storing the instruction value which is an arithmetic result of the user program and outputs the generated cyclic frame 55 to the communication processing part 186, and performs a reception process of extracting the field information for the user program from the cyclic frame 55 received from the slave 40. Specifically, at each period based on the control period, the frame processing part 188 exchanges the plurality of cyclic frames 55 with the ring topology at the period.

The cyclic suppression part 180 includes a port control part 1810 and a detection part 1820 which are one embodied example of "instruction means." The detection part 1820 includes a recovery detection part 1821 that detects recovery of a path from disconnection because of connection of the disconnected path, a connection state detection part 1822 that detects a connection stat of the network 4 of the ring topology, a mode determination part 1823 that determines an output aspect (mode) of the opening command 54, and a transmission permission part 1824 that permits transmission of a frame to the frame processing part 188 after the opening command 54 is transmitted.

The communication processing part 186 is an interface used for the master 10 to transmit and receive data to and from the slave 40 to correspond to the communication controller 110. The communication processing part 187 is an interface used for the master 10 to transmit and receive data to and from the support device 200 to correspond to the USB controller 112. The notifying part 1871 outputs the notification to the support device 200.

The port control part 1810 generates the command frame 56 storing the opening command 54 based on an output from the detection part 1820 and outputs the generated command frame 56 to the communication processing part 186. The opening command 54 indicates an instruction to open the input port 410 or the output port 420 of the slave 40 connected to a disconnected portion of the path when the path is recovered from the disconnection.

For example, a cable (wiring) is connected to the disconnected portion of the path in response to, for example, a user manipulation. Thus, the path is recovered from the disconnection. The recovery detection part 1821 detects the recovery in accordance with an input from the outside, for example.

The connection state detection part 1822 detects a position of a disconnected/connected portion of the network 4 on the ring topology. The details thereof will be described below.

The mode determination part 1823 sets an output aspect of the opening command 54 by the port control part 1810 differently in accordance with the position of the disconnected/connected portion detected by the connection state detection part 1822. Here, the output aspect of the opening command 54 includes a "second mode" in which the detected position of the disconnected/connected portion is between the end point of the divergence slave 40-0 and the adjacent slave "D" and a "first mode" in which the detected position is another position of the ring topology, that is, a position between the start point of the divergence slave 40-0 and the slave "D." The output aspect of the opening command 54 in accordance with each mode will be described below.

(F2. Detection of Disconnected Portion of Ring Topology)

The connection state detection part 1822 detects the configuration of the network 4 of the ring topology using pre-decided detection data.

Specifically, the detection data includes first data and second data for acquiring time stamp information indicating a time at which the first data passes through each slave 40 from each slave 40. The connection state detection part 1822 first sends out the first data to the network 4 of the ring topology. The connection state detection part 1822 sends out the second data to the network 4 after the first data returned via the network 4 of the ring topology is received. Then, the connection state detection part 1822 receives the second data returned via the network 4 of the ring topology.

The foregoing time stamp information is a time (hour) when the data passes through each port. For example, when data accepted to the input port 410 is output from the output port 420, the time stamp information includes a time at which the data passes through the input port 410, a time at which the data passes through the output port 420, and an identifier of the port (that is, a pair of identifier of the slave 40 and identifier of the port). The time stamp can be stored in the data processing part in each slave 40.

The connection state detection part 1822 can specify a passing order which is a sequence of the ports through which the data passes by using the time stamp. The connection state detection part 1822 can determines whether one of the "input from OUT to IN" and the "input from IN to OUT" is performed between two slaves 40 connected to each other via the network 4 by using the time stamp. The connection state detection part 1822 can compare data indicating the passing order of the ports acquired with the time stamp with information indicating the connection relation indicated by the network configuration information 1851 and can specify each of the identifiers of the ports in which the data passes and the ports in which no data passes based on a comparison result.

Based on the specified port identifier, the connection state detection part 1822 can detect the position of the path disconnected in the network 4 of the ring topology and can detect that the disconnected path is connected and recovered.

The mode determination part 1823 compares an output of the connection state detection part 1822 with the network configuration information 1851 based on a comparison result, specifies the detection position of the connection/disconnection, and determines the "second mode" or the "first mode" based on the specified detection position.

(F3. Functional Configuration of Slave 40)

Figure 8:
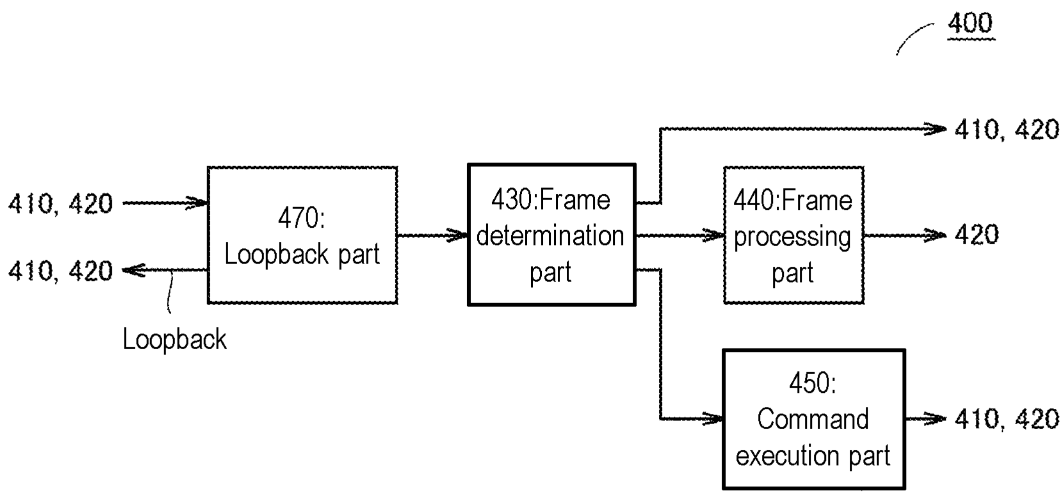
FIG. 8 is a diagram schematically illustrating an example of a functional configuration of a slave according to the embodiment.

FIG. 8 is a diagram schematically illustrating an example of a functional configuration of the slave 40 according to the embodiment. Referring to FIG. 8, the processor 400 of the slave 40 includes a loopback part 470, a frame determination part 430, a frame processing part 440, and a command execution part 450 that executes the opening command 54.

When it is detected that a path between the slave 40 including the loopback part 470 and an adjacent slave 40 is disconnected, the loopback part 470 loops back the "input from IN to OUT" of the slave 40 to the "input from OUT to IN" or loops back the "input from OUT to IN" to the "input from IN to OUT."

The frame determination part 430 determines a kind of frame based on the type 58 of the frame accepted to the input port 410 or the output port 420. The frame determination part 430 outputs a frame which is accepted to the input port 410 and indicates that type 58 of the frame is "normal," that is, the cyclic frame 55 at the normal time, to the frame processing part 440, and outputs a frame which is accepted to the output port 420 and indicates that the type 58 of the frame is "normal," that is, a reverse cyclic frame 55, to the input port 410 by bypassing the frame processing part 440.

Further, the frame determination part 430 specifies a frame indicating that the type 58 is a "command" among frames accepted to the input port 410 or the output port 420, that is, the command frame 56. When the frame determination part 430 determines that the port identifier 59 of the specified command frame 56 indicates the input port 410 or the output port 420 of the slave 40, the command frame 56 is output to the command execution part 450 and the command frame 56 is sent out to the network 4 via the input port 410 or the output port 420.

The command execution part 450 executes the opening command 54 of the command frame 56 output from the frame determination part 430. Thus, a port opening process of opening the input port 410 or the output port 420 instructed with the opening command 54 is performed.

(F4. Method of Implementing Port Opening)

Figure 9:
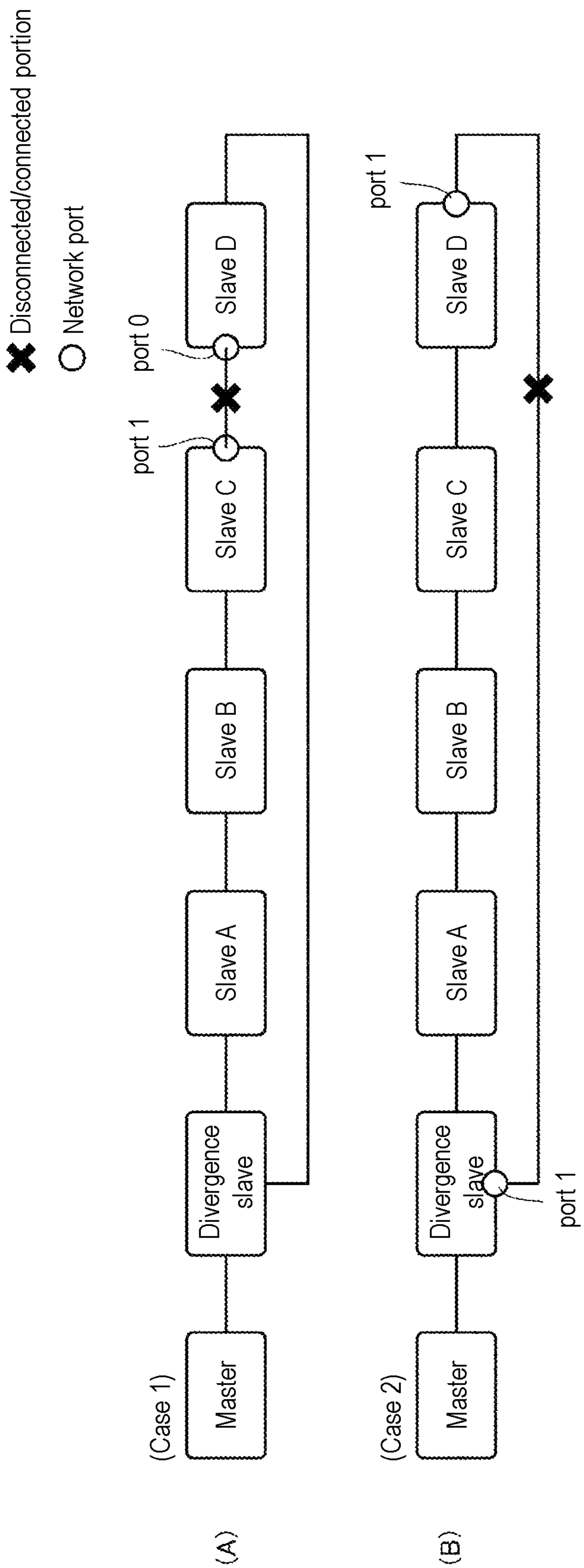
FIG. 9 is a diagram schematically illustrating positions of disconnected/connected paths in (case 1) and (case 2) according to the embodiment.
Figure 10:
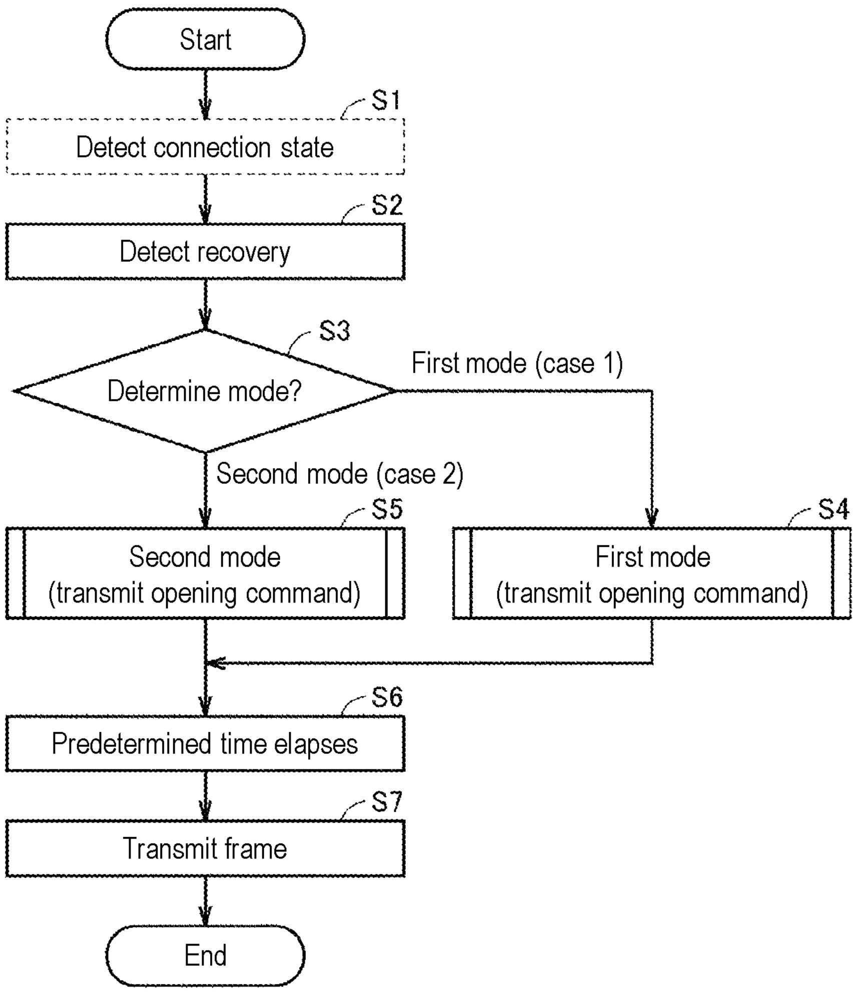
FIG. 10 is a flowchart illustrating a process according to the embodiment.

In the embodiment, when a disconnected path is connected, the master 10 optimizes an opening order of the input ports 410 and the output ports 420 of the slaves 40 connected to the path in accordance with a position of the path in the ring topology. Specifically, the master 10 determines an opening order in which occurrence of the reverse cyclic frame 55 (Step2 of FIG. 5) is suppressed. The positions of the disconnected/connected paths according to the embodiment include a position of (case 1) and a position of (case 2). FIG. 9 is a diagram schematically illustrating positions of disconnected/connected paths in (case 1) and (case 2) according to the embodiment. FIG. 10 is a flowchart illustrating a process according to the embodiment.

In (case 1), referring to (A) of FIG. 9, the connection state detection part 1822 detects that a path between the output port 420 (port1) of the slave "C" and the input port 410 (port0) of the slave "D" is disconnected. In (case 2), referring to (B) of FIG. 9, the connection state detection part 1822 detects that a path between the port (port1) constituting the end point of the slave "D" and the output port 420 (port1) of the divergence slave 40-0 is disconnected. In (case 1) of (A) of FIG. 9, the disconnected portion of the path is a position between the slave "C" and the slave "D," but the disconnected portion is not limited to this position. The disconnected portion may be any of a position between the start point of the divergence slave 40-0 and the slave "A," a position between the slave "A" and the slave "B," and a position between the slave "B" and the slave "C."

Referring to FIG. 10, the connection state detection part 1822 detects the input port 410 and the output port 420 of the slaves 40 of which the path is connected to the disconnected portion in the network 4 of the ring topology (step S1). The recovery detection part 1821 detects that the path is recovered from the disconnection based on an external input (step S2). When it is detected that the path is recovered from the disconnection, the mode determination part 1823 compares information regarding the input port 410 and the output port 420 of the slaves 40 detected in step S1 with the network configuration information 1851 and detects that the disconnected/connected portion in the path (hereinafter also referred to as the "disconnection/connection portion) corresponds to one of (case 1) and (case 2) based on a comparison result. When it is detected that the disconnection/connection portion corresponds to (case 1), the mode determination part 1823 determines that port opening is performed in accordance with the "first mode" (the "first mode" in step S3). The port control part 1810 transmits the opening command 54 in accordance with the "first mode" (step S4).

When it is detected that the disconnection/connection portion corresponds to (case 2), the mode determination part 1823 determines that the port opening is performed in accordance with the "second mode" (the "second mode" in step S3). The port control part 1810 transmits the opening command 54 in accordance with the "second mode" (step S5).

The transmission permission part 1824 outputs a notification indicating a frame transmission permission from the time of transmission of the opening command 54 in step S4 or S5, for example, in response to detection of elapse of a predetermined time, to the frame processing part 188 (step S6). The frame processing part 188 starts transmitting the cyclic frame 55 at the normal time to the network 4 of the ring topology in response to reception of a notification indicating a transmission permission from the transmission permission part 1824 (step S7).

(F4-1. Opening Order of Ports in "First Mode")

FIGS. 11 to 14 are diagrams schematically illustrating a flow of a frame in the "first mode" of (case 1) according to the embodiment. A thick line arrow in FIGS. 11 to 14 indicates a direction in which the frame 50 flows. The process of step S4 (see FIG. 10) will be described with reference to FIGS. 11 to 14. In FIGS. 11 to 14, a path between the divergence slave 40-0 and the slave "A" is disconnected. Accordingly, the connection state detection part 1822 outputs an identifier portY (see FIG. 11) of the output port 420 of the divergence slave 40-0 and an identifier portX (see FIG. 11) of the input port 410 of the slave "A."

Figure 11:
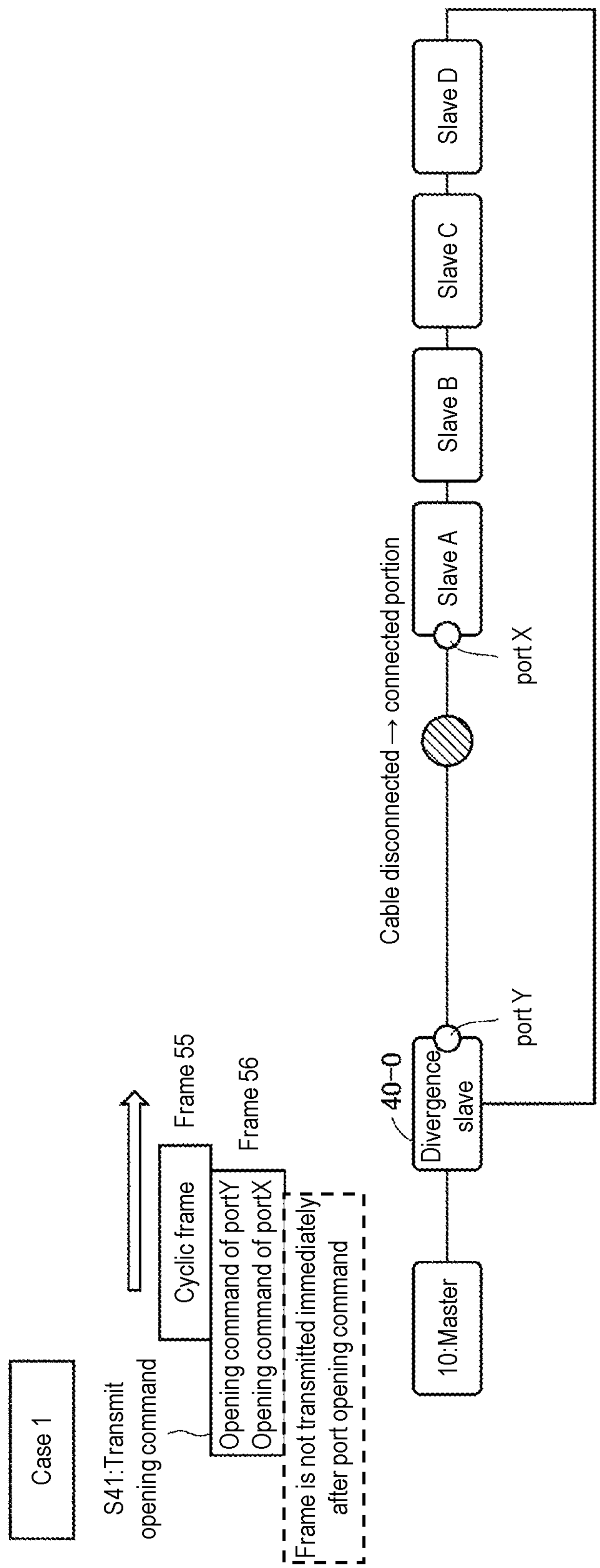
FIG. 11 is a diagram schematically illustrating a flow of a frame in a "first mode" according to the embodiment.
Figure 12:
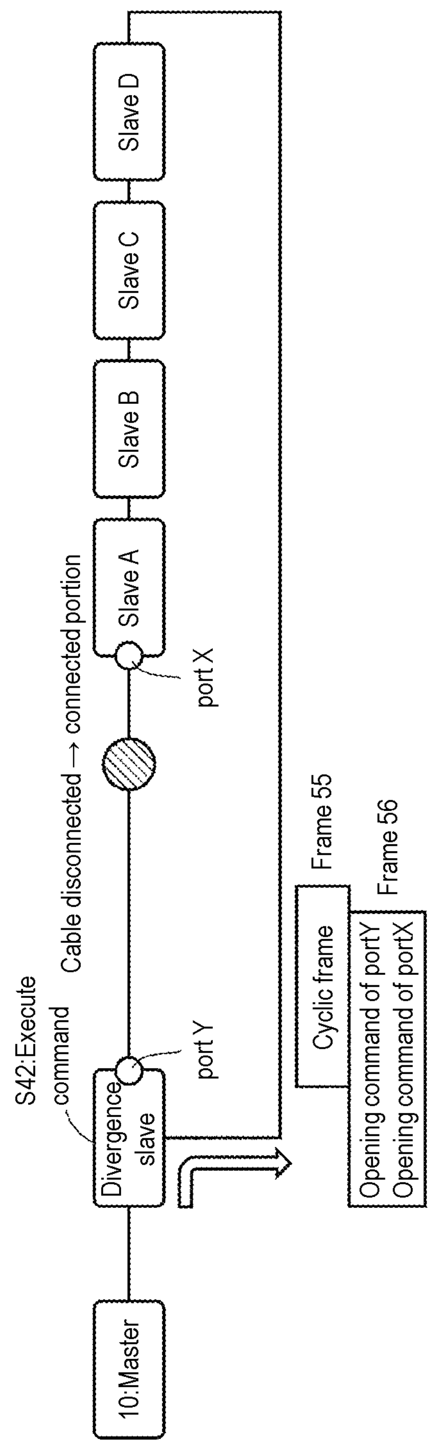
FIG. 12 is a diagram schematically illustrating the flow of the frame in the "first mode" according to the embodiment.

In FIG. 11, the master 10 transmits the cyclic frame 55 at the normal time (shown as a cyclic frame 55 in the drawing) to the network 4 of the ring topology and continuously transmits the command frame 56. The port control part 1810 generates the command frame 56 storing both the opening command 54 of the port X and the opening command 54 of the port Y based on an output of the connection state detection part 1822 and sends out the generated command frame 56 to the network 4 of the ring topology (step S41 of FIG. 11). The master 10 does not transmit a frame such as the cyclic frame 55 at the normal time immediately after the transmission of the command frame 56.

The divergence slave 40-0 receives the command frame 56 sent out in step S41. The command execution part 450 of the divergence slave 40-0 determines the opening command 54 of the received command frame 56 is destinated for the divergence slave 40-0 based on content of the received command frame 56 and executes the opening command 54 (step S42 of FIG. 12). Thus, the portY of the divergence slave 40-0 is opened. Since the master 10 does not transmit a new frame immediately after the transmission of the command frame 56, there is no frame which passes through the opened portY and is accepted to the portX.

Figure 13:
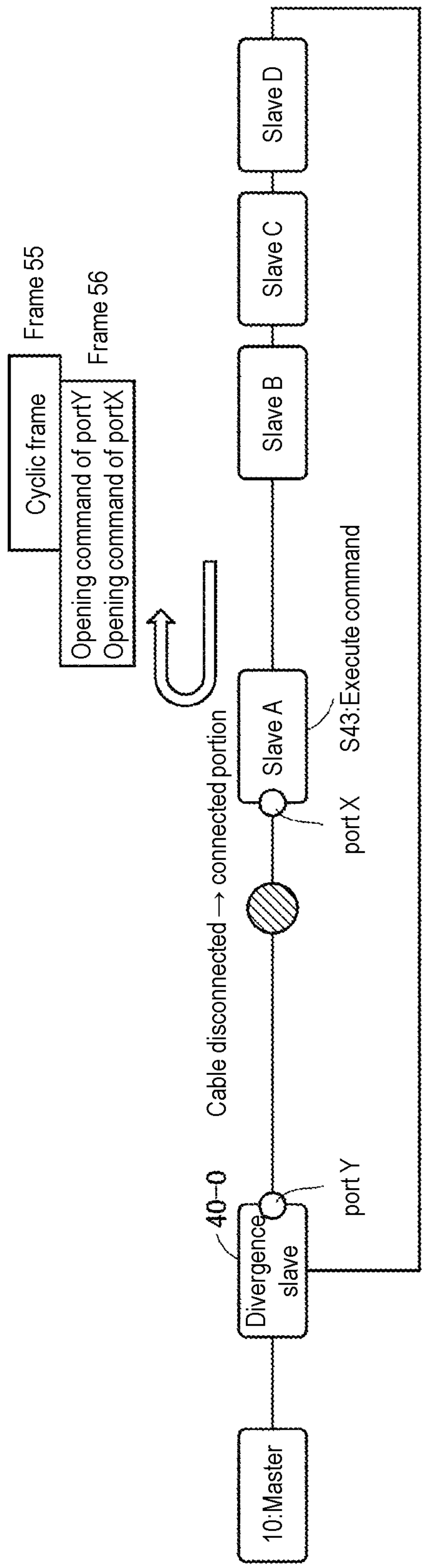
FIG. 13 is a diagram schematically illustrating the flow of the frame in the "first mode" according to the embodiment.
Figure 14:
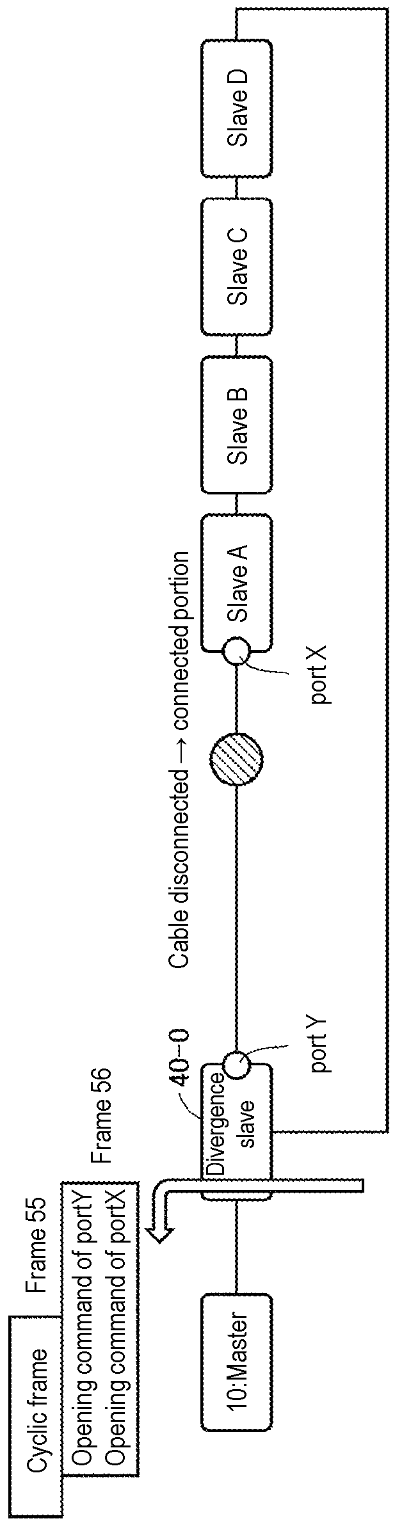
FIG. 14 is a diagram schematically illustrating the flow of the frame in the "first mode" according to the embodiment.

When the portY is opened, the cyclic frame 55 at the normal time and the command frame 56 arrive at the port 410 of the divergence slave 40-0, the slave "D," the slave "C," the slave "B," and the slave "A" in a flow in one direction along the "input from OUT to IN." The command execution part 450 of the slave "A" determines that the command frame 56 is a frame destinated for the slave "A" based on the content of the received command frame 56 and executes the opening command 54 of the command frame 56 (step S43 of FIG. 13). At this time, the slave "A" loops back the command frame 56 and the cyclic frame 55 (see FIG. 13). The looped-back cyclic frame 55 and the command frame 56 return to the master 10 (see FIG. 14).

Thus, when the portX is opened, the master 10 does not transmit a new frame immediately after the command frame 56 is transmitted. Therefore, there is no frame which passes through the opened portX and is accepted to the portY. That is, the reverse cyclic frame does not occur.

The transmission permission part 1824 outputs a transmission permission notification when the master 10 detects that the predetermined time has elapsed from the time of transmission of the command frame 56. When the transmission permission notification is received from the transmission permission part 1824, the frame processing part 188 generates the cyclic frame 55 at the normal time in accordance with the transmission permission and sends out the generated cyclic frame 55 to the network 4 of the ring topology (steps S6 and S7 of FIG. 10).

The predetermined time clocked by the transmission permission part 1824 is based on a propagation delay time of the frame 50 in the network 4 which is the ring wiring. More specifically, the predetermined time is based on a required time until the command frame 56 is sent out from the master 10 and is returned (a propagation delay time) or a required time when the command frame 56 is circulated once in the ring topology (a propagation delay time). The required time is estimated (calculated) in advance. The timing at which the transmission permission part 1824 outputs the transmission permission notification is based on the propagation delay time of the command frame 56 and may be, for example, a time at which the master 10 detects arrival of the command frame 56 returned from the network 4 of the ring topology.

(F4-2. Opening Order of Ports in "Second Mode")

FIGS. 15 to 20 are diagrams schematically illustrating a flow of a frame in the "second mode" according to the embodiment. A thick arrow in FIGS. 15 to 20 indicates a direction in which the frame 50 flows. A process of (case 2) in step S5 (see FIG. 10) will be described with reference to FIGS. 15 to 20. In FIGS. 15 to 20, a path between a portZ which is an end point of the divergence slave 40-0 and the portY which is the output port 420 of the slave "D" is disconnected. Accordingly, the connection state detection part 1822 outputs an identifier portZ (see FIG. 15) of the port of the divergence slave 40-0 and an identifier portY (see FIG. 15) of the output port 420 of the slave "D."

Figure 15:
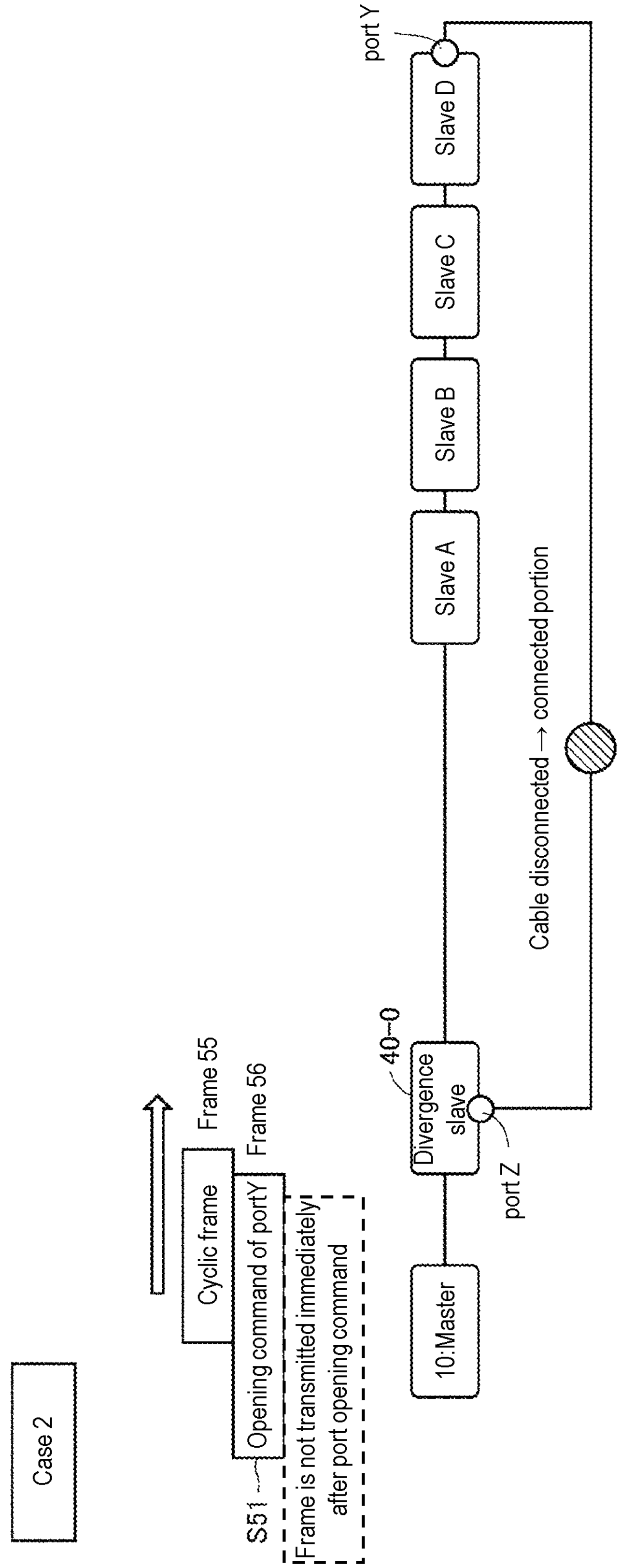
FIG. 15 is a diagram schematically illustrating a flow of a frame in a "second mode" according to the embodiment.
Figure 16:
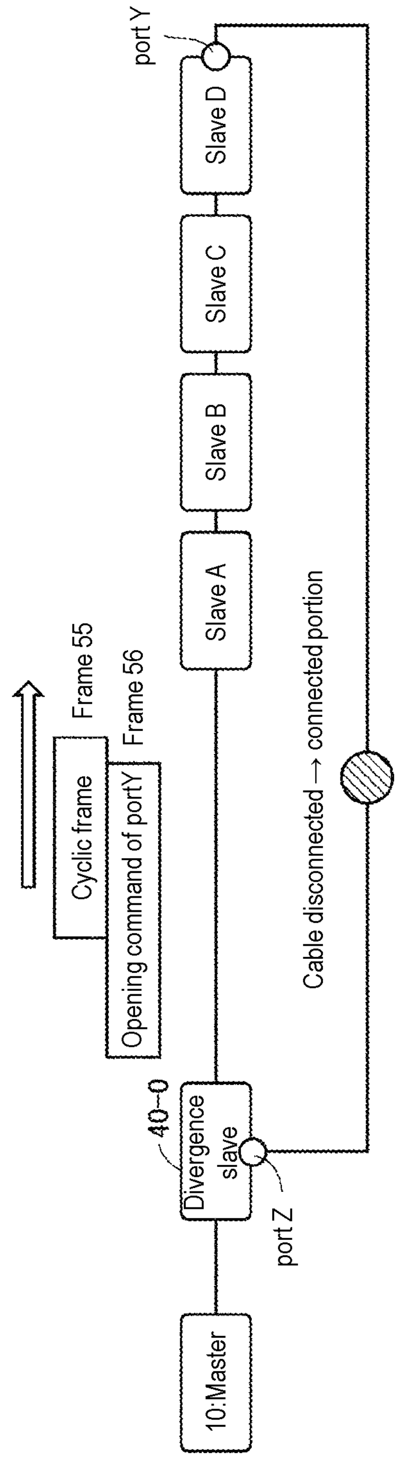
FIG. 16 is a diagram schematically illustrating the flow of the frame in the "second mode" according to the embodiment.

In FIG. 15, the master 10 transmits the command frame 56 to the network 4 of the ring topology subsequently to the cyclic frame 55 at the normal time. The port control part 1810 generates the command frame 56 storing only the opening command 54 of the portY based on an output of the connection state detection part 1822 and sends out the generated command frame 6 to the network 4 of the ring topology (step S51 of FIG. 15). Immediately after the command frame 56 is transmitted, the master 10 does not transmit a frame such as the cyclic frame 55 at the normal time.

The cyclic frame 55 at the normal time and the command frame 56 first arrive at the divergence slave 40-0. The cyclic frame 55 at the normal time and the command frame 56 pass through the divergence slave 40-0 (see FIG. 16). If the opening command 54 of the portZ of the divergence slave 40-0 is stored in the command frame 56, the opening command 54 is executed. Then, the portZ is opened, all the returned frames 50 may become reverse cyclic frames transferred to the slave "D" via the portZ. To avoid the occurrence of the reverse cyclic frame, the master 10 does not transmit the opening command 54 of the portZ at this time.

Figure 17:
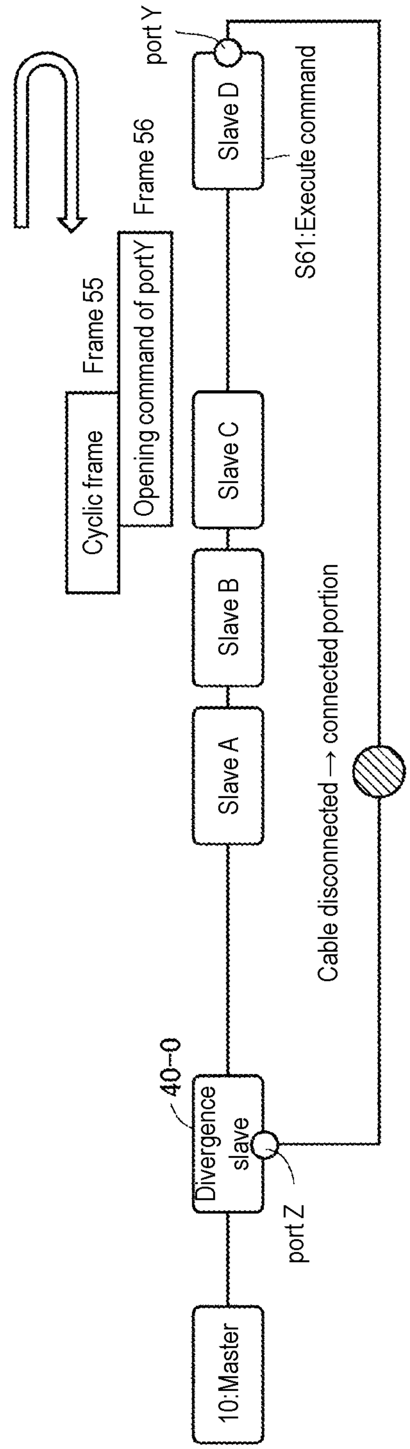
FIG. 17 is a diagram schematically illustrating the flow of the frame in the "second mode" according to the embodiment.

When the cyclic frame 55 at the normal time and the command frame 56 pass through the divergence slave 40-0, the cyclic frame 55 at the normal time and the command frame 56 pass through the slave "A," the slave "B," and the slave "C" and arrive at the slave "D." When the command frame 56 arrives at the slave "D," the command execution part 450 of the slave "D" determines that the command frame 56 is a frame destined for the slave "D" based on the content of the command frame 56 and executes the opening command 54 of the command frame 56 based on a determination result (step S61 of FIG. 17). Thus, the portY of the slave "D" is opened.

Figure 18:
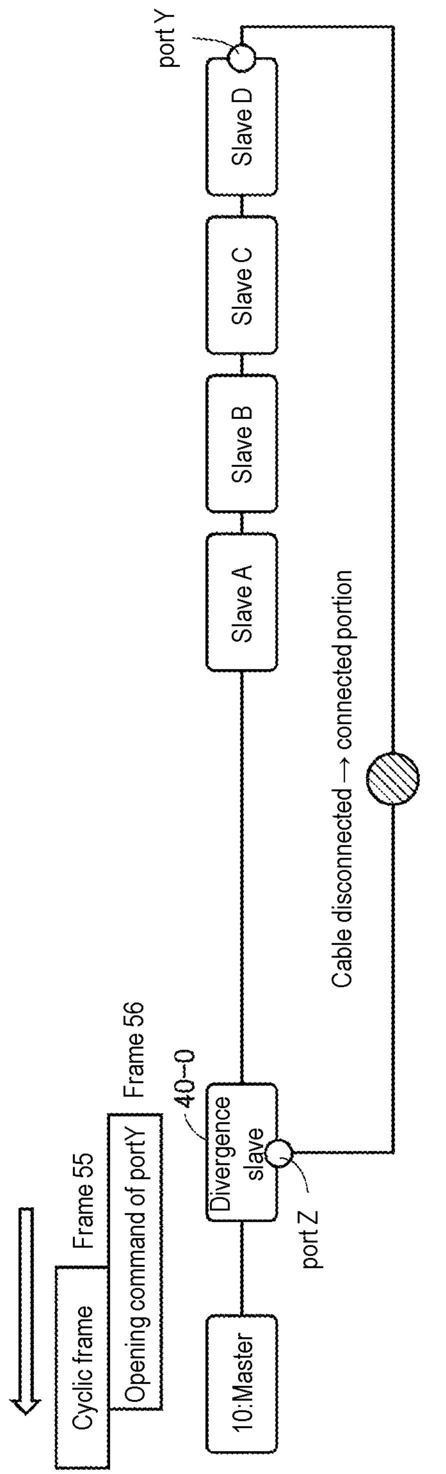
FIG. 18 is a diagram schematically illustrating the flow of the frame in the "second mode" according to the embodiment.
Figure 19:
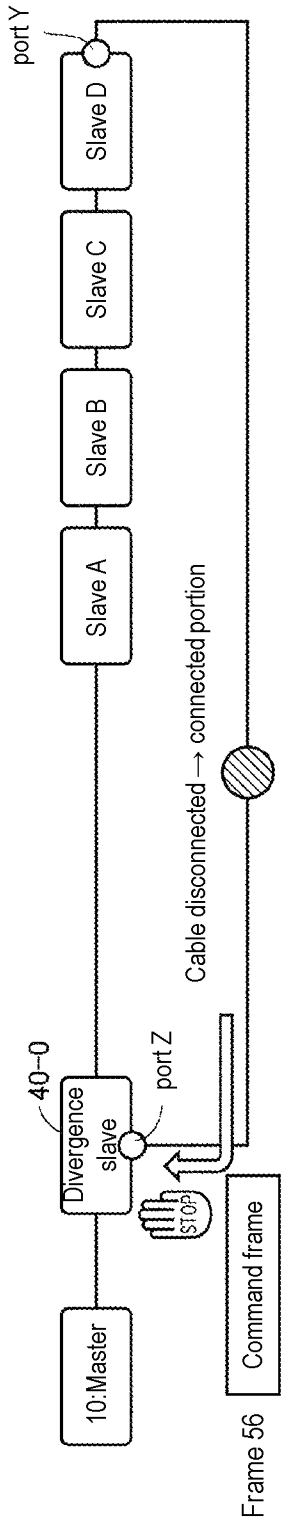
FIG. 19 is a diagram schematically illustrating the flow of the frame in the "second mode" according to the embodiment.
Figure 20:
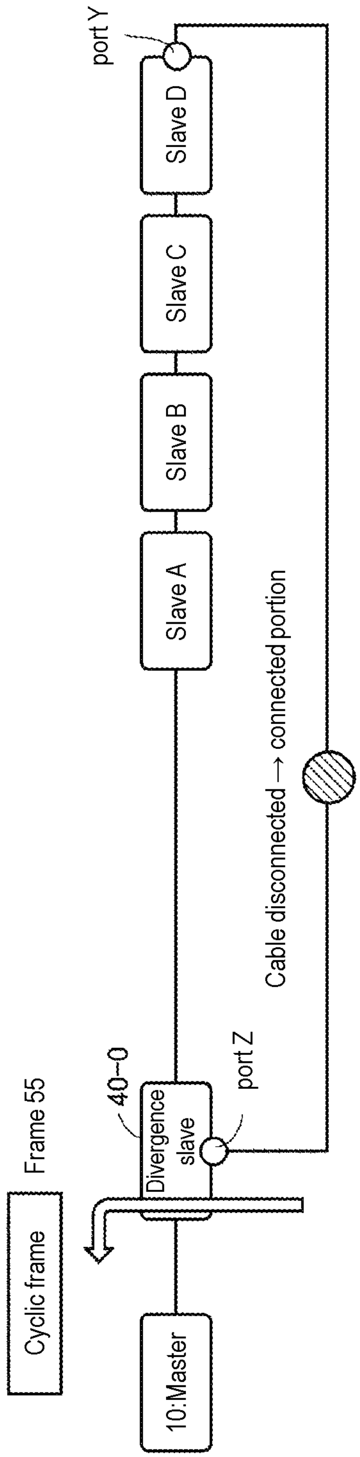
FIG. 20 is a diagram schematically illustrating the flow of the frame in the "second mode" according to the embodiment.

When the portY is opened, the cyclic frame 55 at the normal time and the command frame 56 arrive at the master 10 via the input port 410 of the slave "D," the slave "C," the slave "B," the slave "A," and the divergence slave 40-0 in the flow in one direction along the "input from OUT to IN" (see FIG. 18).

Since the master 10 does not transmit the frame immediately after the transmission of the command frame 56, the reverse cyclic frame does not occur immediately after the opening of the portY.

The transmission permission part 1824 outputs a transmission permission notification when the master 10 detects that the predetermined time has elapsed from the time of transmission of the command frame 56. When the transmission permission notification is received from the transmission permission part 1824, the frame processing part 188 generates the frame 50 such as the cyclic frame 55 at the normal time and sends out the generated frame 50 to the network 4 of the ring topology (steps S6 and S7 of FIG. 10).

At a subsequent period, the master 10 transmits the command frame 56 storing a predetermined command to the network 4 of the ring topology. When the command frame 56 is transmitted in the direction along the "input from IN to OUT" and arrives at the portZ of the divergence slave 40-0 via the opened portY of the slave "D," the divergence slave 40-0 receives this command frame 56 and executes the predetermined command of the received command frame 56. In accordance with an execution result, the portZ is opened and the command frame 56 is lost in the portZ (see FIG. 19). The losing is indicated by "STOP" in FIG. 19. A process of opening the portZ using the predetermined command conforms with the specification of ASIC of EtherCAT.

Further, after the elapse of the predetermined time is clocked by the transmission permission part 1824, the master 10 transmits the cyclic frame 55 at the normal time of a subsequent period to the network 4 of the ring topology. The cyclic frame 55 is transmitted in the direction along the "input from IN to OUT" and is returned to the master 10 via the opened portY of the slave "D" and the portZ of the divergence slave 40-0 (see FIG. 20).

The predetermined time clocked by the transmission permission part 1824 is based on a time which is based on the propagation delay time of the ring wiring. Specifically, the predetermined time is based on a required time until the command frame 56 of the predetermined command is sent out from the master 10 and is returned (the propagation delay time).

<G. Detection and Discarding of Cyclic Frame>

In the embodiment, when it is detected that the reverse cyclic frame arrives, the master 10 discards the arriving reverse cyclic frame. This method can be applied to (case 1).

Figure 21:
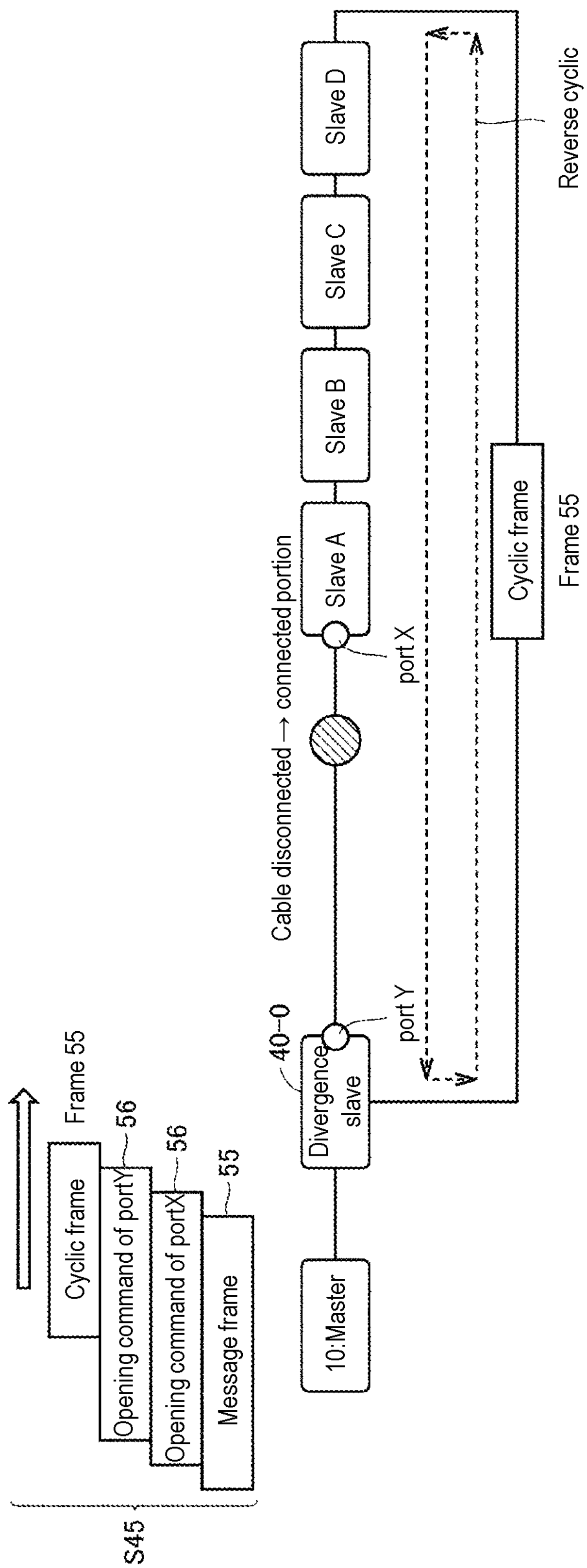
FIG. 21 is a diagram schematically illustrating another flow of the frame in the "first mode" according to the embodiment.
Figure 22:
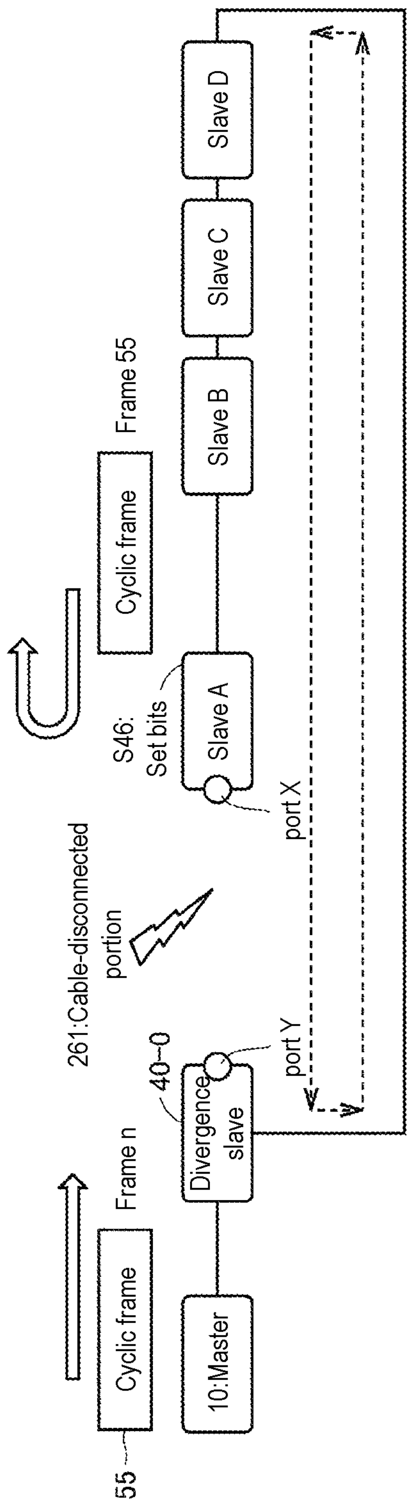
FIG. 22 is a diagram schematically illustrating the other flow of the frame in the "first mode" according to the embodiment.
Figure 23:
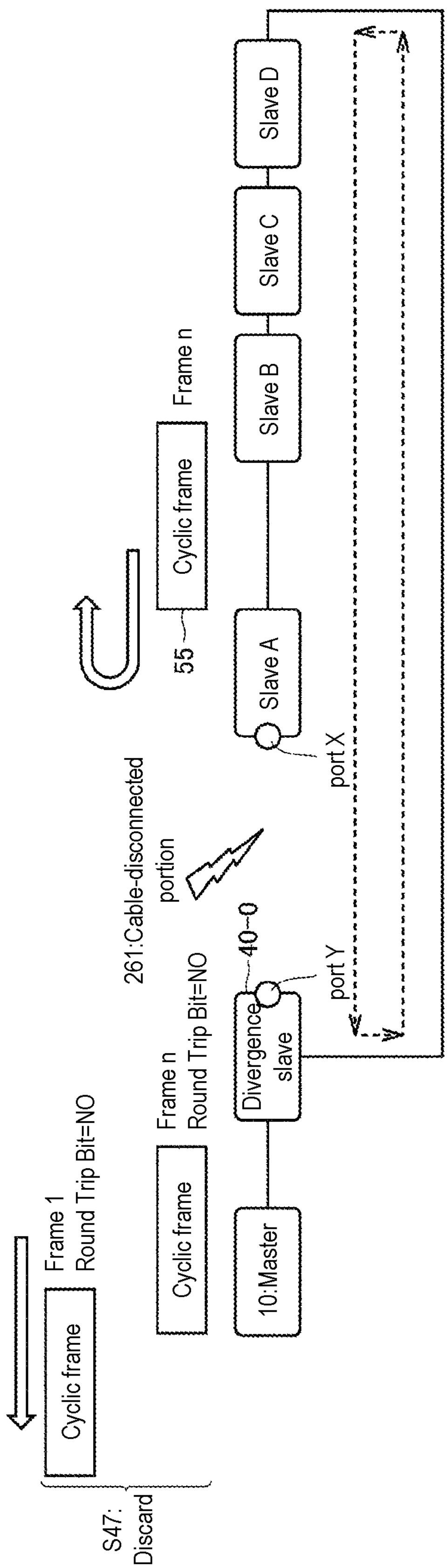
FIG. 23 is a diagram schematically illustrating the other flow of the frame in the "first mode" according to the embodiment.
Figure 24:
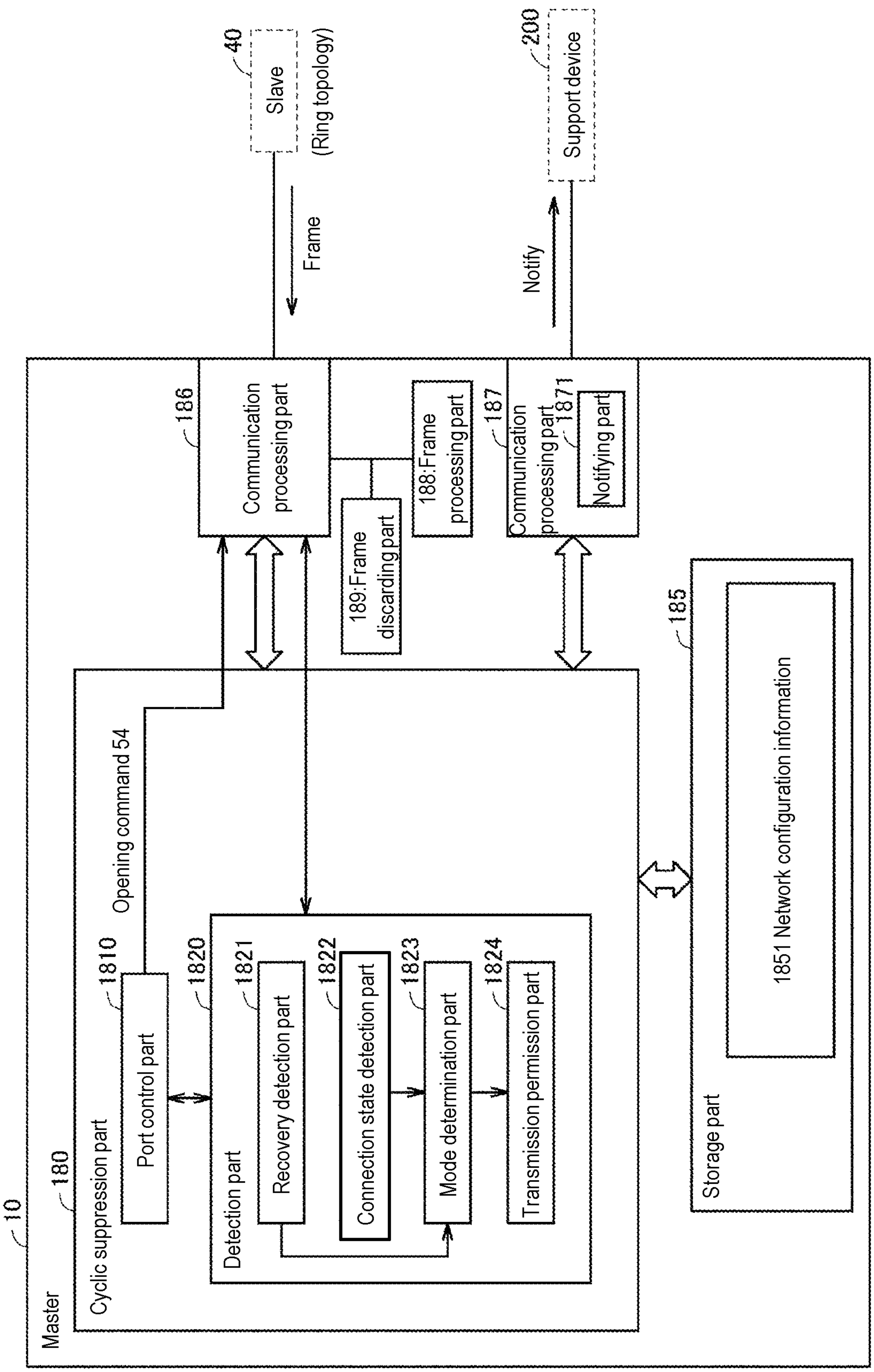
FIG. 24 is a diagram schematically illustrating another example of the functional configuration of the master according to the embodiment.
Figure 25:
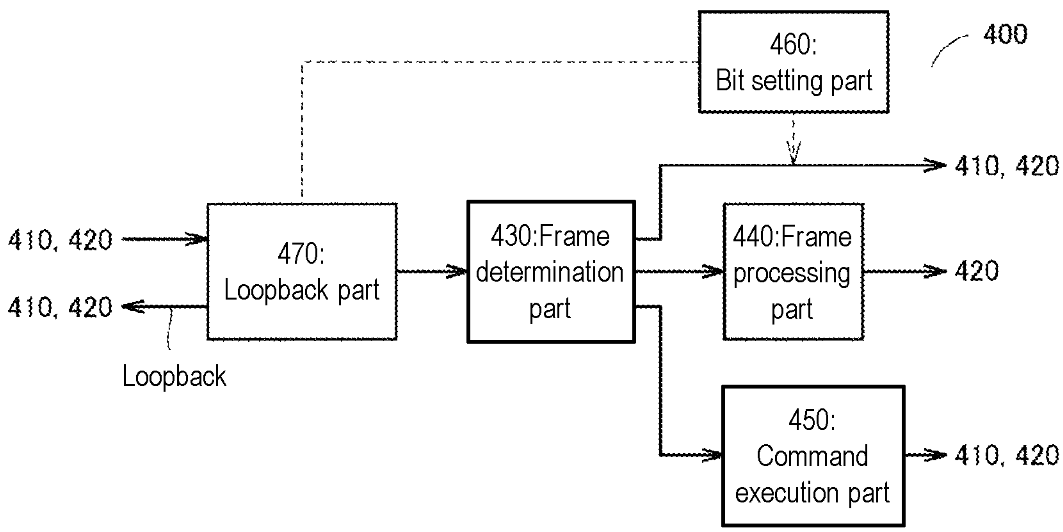
FIG. 25 is a diagram schematically illustrating another example of the functional configuration of the slave according to the embodiment.
Figure 26:
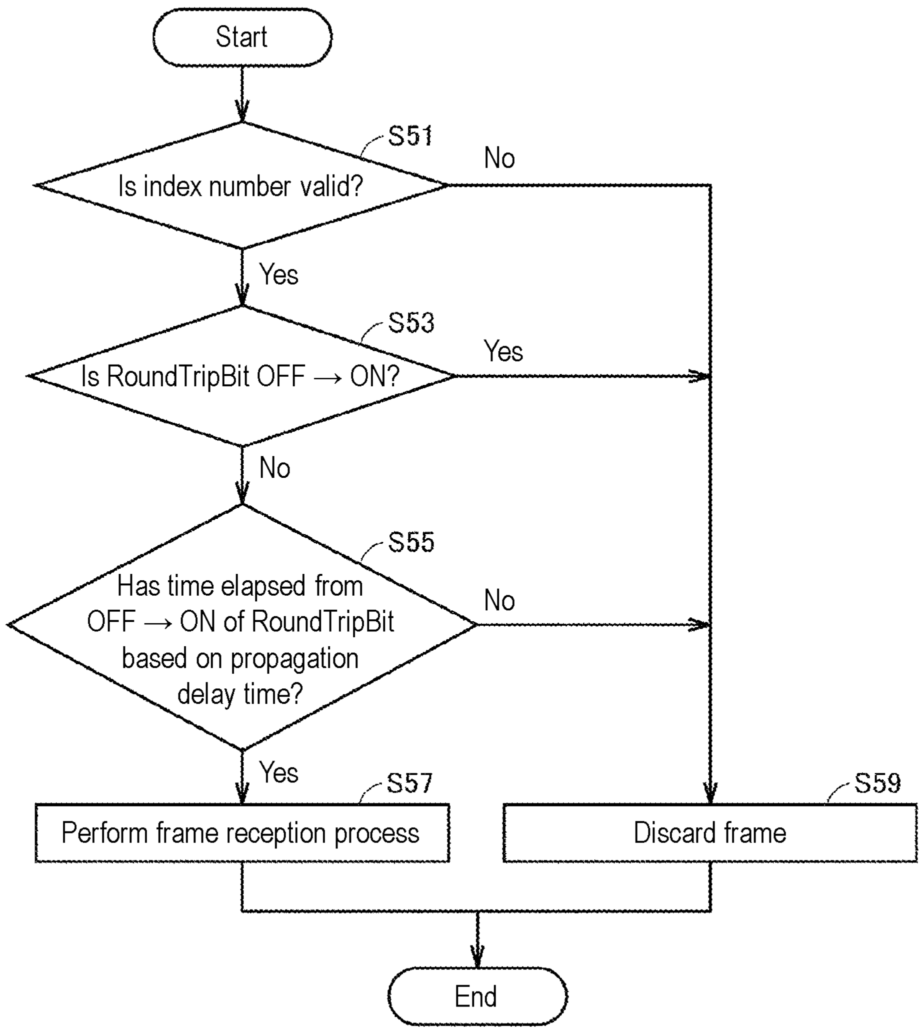
FIG. 26 is a diagram illustrating an example of a flowchart of a process in the "first mode" according to the embodiment.

FIGS. 21 to 23 are diagrams schematically illustrating another flow of the frame in the "first mode" according to the embodiment. FIG. 24 is a diagram schematically illustrating another example of the functional configuration of the master 10 according to the embodiment. FIG. 25 is a diagram schematically illustrating another example of the functional configuration of the slave 40 according to the embodiment. FIG. 26 is a diagram illustrating an example of a flowchart of a process in the "first mode" according to the embodiment.

Referring to FIG. 25, the processor 400 of the slave 40 includes a bit setting part 460 in addition to the configuration of FIG. 8. The bit setting part 460 sets "ON" in the RoundTripBit 57 of the cyclic frame 55 (that is, the reverse cyclic frame) bypassing the frame processing part 440 among the cyclic frames 55 arriving at the slave 40 to send out the cyclic frame 55 to the network 4. The master 10 sets "OFF" of an initial value in the RoundTripBit 57 when the command frame 56 is sent out to the network 4 of the ring topology.

Referring to FIG. 24, the master 10 includes a frame discarding part 189 in addition to the configuration of FIG. 7. The frame discarding part 189 detects (extracts) the reverse cyclic frame from the frames received by the communication processing part 186 and output to the frame processing part 188 and discards the detected cyclic frame. Specifically, the frame discarding part 189 detects (extracts) the cyclic frame 55 in which the RoundTripBit 57 is set to "ON" among the cyclic frames 55 arriving at the master 10 and discards the detected cyclic frame 55. Thus, for example, the reverse cyclic frame equivalent to the cyclic frame 55 of a previous period rather than a present period is inhibited from being output from the communication processing part 186 to the frame processing part 188, and thus the reverse cyclic frame can be excluded from a processing target frame of the user program.

A thick line arrow in FIGS. 21 to 23 indicate a direction in which the frame 50 flows. Another example of the process of step S4 (see FIG. 10) will be described with reference to FIGS. 21 to 23. In FIGS. 21 to 23, a path between the divergence slave 40-0 and the slave "A" is disconnected as indicated by a cable-disconnected portion 261. Accordingly, outputs of the connection state detection part 1822 are an identifier portY (see FIG. 21) of the output port 420 of the divergence slave 40-0 and an identifier portX (see FIG. 21) of the input port 410 of the slave "A."

The master 10 sequentially sends out two command frames 56 to the network 4 of the ring topology after the cyclic frame 55 at the normal time and transmits the frame 55 of a message immediately after the sending of the cyclic frames 55. Of the two command frames 56, the first sent command frame 56 stores the opening command 54 of the portY and the second sent command frame 56 stores the opening command 54 of the portX.

The port control part 1810 generates the first command frame 56 and the second command frame 56 based on the output of the connection state detection part 1822 and sequentially sends out the generated two command frames 56 to the network 4 of the ring topology (step S45 of FIG. 21).

When two frames, the first cyclic frame 55 and the command frame 56 storing the opening command 54 of the portY (which are referred to as 'two former frames'), are received, the divergence slave 40-0 executes the opening command 54 of the portY stored in the received command frame 56. The portY is opened in accordance with an execution result.

Then, the two former frames are transferred from the divergence slave 40-0 in the direction of the slave "D," the slave "C," and the slave "B" along the "input from OUT to IN" and arrives at the slave "A." The divergence slave 40-0 receives the two frames, the command frame 56 of the opening command 54 of the portX and the frame 55 of the message (which are referred to as 'two latter frames') and transfer the received two latter frames to the slave "A" via the opened portY. Since the portX of the slave "A" is not opened, the two latter frames are lost in the portX of the slave "A." At this time, the portX of the slave "A" is opened. This operation conforms with the specification of ASIC of EtherCAT. In this way, the path between the divergence slave 40-0 and the slave "A" is recovered from the disconnection.

In the slave "A," when the cyclic frame 55 is received between the two former frames, the loopback part 470 does not open the port X. Therefore, and the cyclic frame 55 is looped back. Because of this loopback, the cyclic frame 55 is reversely circulated in the direction along the "input from OUT to IN." When the loopback part 470 performs the loopback, the bit setting part 460 sets ON in the RoundTripBit 57 of the looped-back cyclic frame 55, that is, changes OFF to ON (step S46 of FIG. 22), that is, changes the RoundTripBit 57 from OFF to ON and stores the time 571 indicating a time at which ON is set in the RoundTripBit 57 in the header 51. The command frame 56 of the opening command 54 of the portY becomes a reverse cyclic frame.

Thereafter, the master 10 also transfers the cyclic frame 55 sent out to the network 4 of the ring topology in the direction of the slave "D," the slave "C," and the slave "B" from the divergence slave 40-0 along the "input from OUT to IN," and thus the cyclic frame 55 arrives at the slave "A." In the slave "A," ON is also set in the RoundTripBit 57 of the cyclic frame 55 and the cyclic frame 55 is looped back. Thereafter, all the cyclic frames 55 looped back in the slave "A" arrive at the master 10.

A case in which the two former frames (that is, two former frames transferred in the direction of the slave "D," the slave "C," and the slave "B" from the divergence slave 40-0 along the "input from OUT to IN") arrive at the slave "A" after the portX is opened in accordance with the specification of ASIC of EtherCAT, will be described. In this case, the two former frames are reversely circulated in the divergence slave 40-0, the slave "D," the slave "C," the slave "B," and the slave "A" from the slave "A" along the "input from OUT to IN via the opened portX. Thereafter, when the path between the divergence slave 40-0 and the slave "A" is disconnected again, the reversely circulated two former frames are looped back to the slave "A" and arrives at the master 10. At the time of the loopback, ON is set in the RoundTripBit 57 in the two former frames in the slave "A."

In the master 10, when the cyclic frame 55 is received from the network 4 of the ring topology, the frame discarding part 189 detects the reverse cyclic frame in which ON is set in the RoundTripBit 57 among the received cyclic frames 55 and discards the detected cyclic frame 55 (step S47 of FIG. 23).

(G1. Detection and Discarding of Cyclic Frame)

A process of the frame discarding part 189 of the master 10 will be described with reference to FIG. 26. In the drawings subsequent to FIG. 26, the index 53 is written as "Index." A value of the index 53 indicates a value within a predetermined range different at each predetermined period. First, the frame discarding part 189 compares the value of the index 53 of the cyclic frame 55 received by the master 10 with a range of the index value of a present period and determines whether the index 53 corresponds to a value within the range of the index value of the present period (that is, whether the index 53 is valid) based on a comparison result (step S51). When it is determined that the value of the index 53 does not correspond within the range of the present period (NO in step S51), the frame discarding part 189 discards the cyclic frame 55 (step S59).

When it is determined that the value of the index 53 corresponds (that is, is valid) within the range of the present period (YES in step S51), the frame discarding part 189 determines whether the RoundTripBit 57 of the cyclic frame 55 indicates ON (step S53). When it is determined that the RoundTripBit 57 indicates ON (YES in step S53), the frame discarding part 189 discards the received cyclic frame 55 (step S59). Conversely, when it is determined that the RoundTripBit 57 does not indicate ON (that is, indicates OFF) (NO in step S53), the frame discarding part 189 determines whether a predetermined time which is based on the propagation delay time has elapsed from the setting of ON in the RoundTripBit 57, based on the time 571 of the cyclic frame 55 (step S55).

When it is determined that the predetermined time has not elapsed after the setting of ON in the RoundTripBit 57 (NO in step S55), the frame discarding part 189 discards the cyclic frame 55 (step S59). Conversely, when it is determined that the predetermined time has elapsed from the setting of ON in the RoundTripBit 57 (YES in step S55), the frame discarding part 189 does not discard the cyclic frame 55 and the frame processing part 188 performs a process of receiving the cyclic frame 55 (step S57).

Through the process of FIG. 26, the master 10 filters the cyclic frames 55 arriving at the master 10 step by step using the index 53, the RoundTripBit 57, and the time 571. Thus, in the master 10, certainty that the cyclic frame 55 which is likely to become the reverse cyclic frame among the cyclic frames 55 arriving at the master 10 from the network 4 of the ring topology is detected is improved.

(G2. Another Example of Detection and Discarding of Cyclic Frame)

Figure 27:
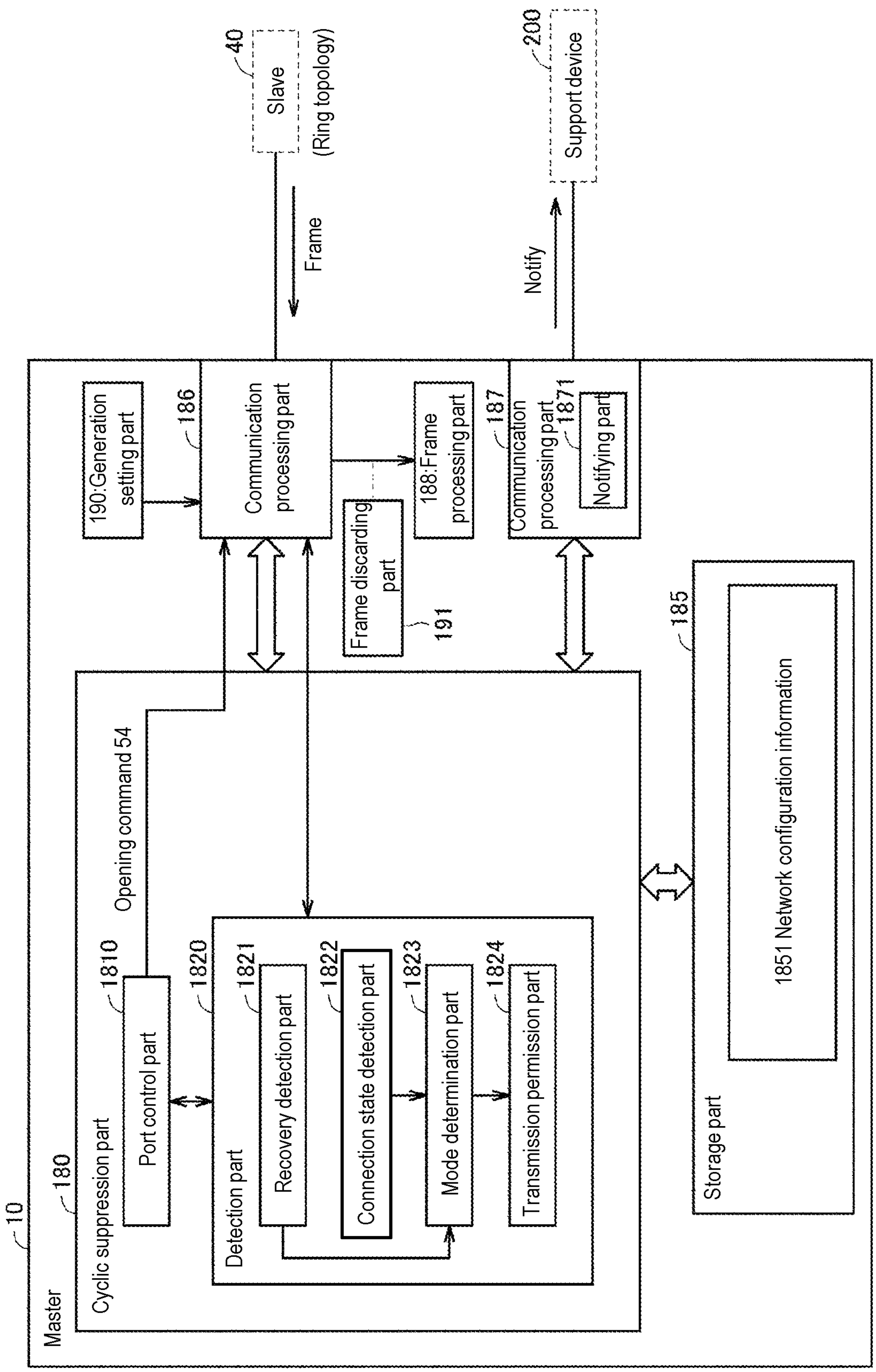
FIG. 27 is a diagram schematically illustrating still another example of the functional configuration of the master according to the embodiment.
Figure 28:
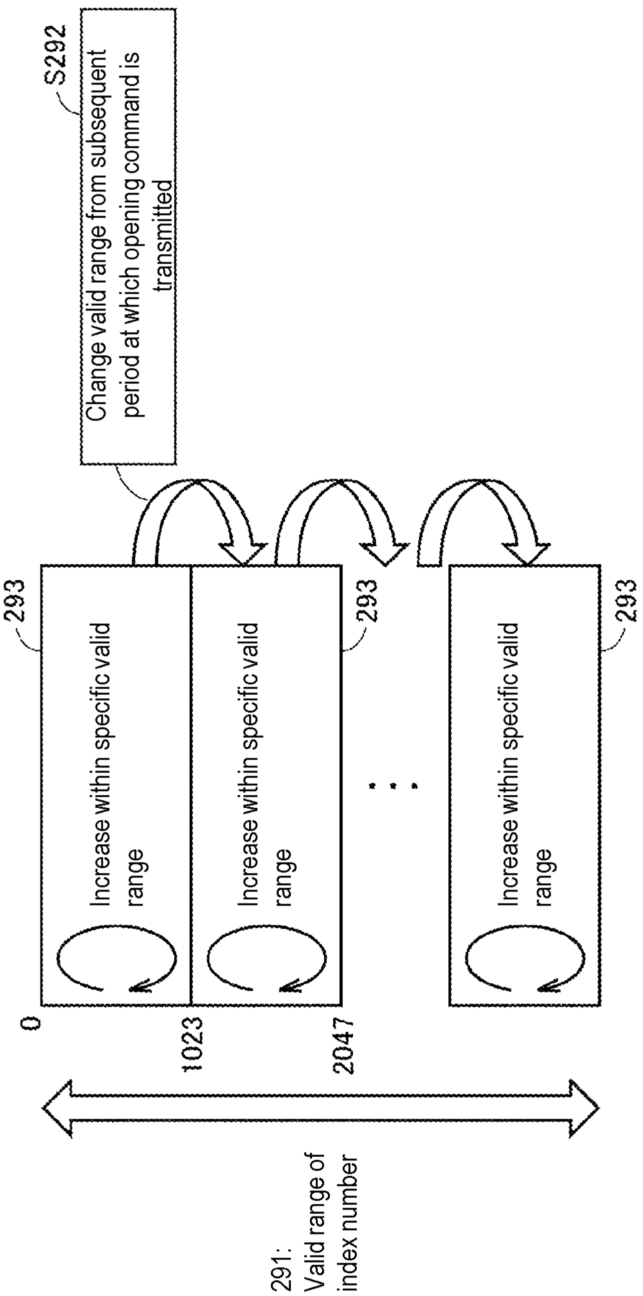
FIG. 28 is a diagram illustrating a process of a generation setting part according to the embodiment.
Figure 29:
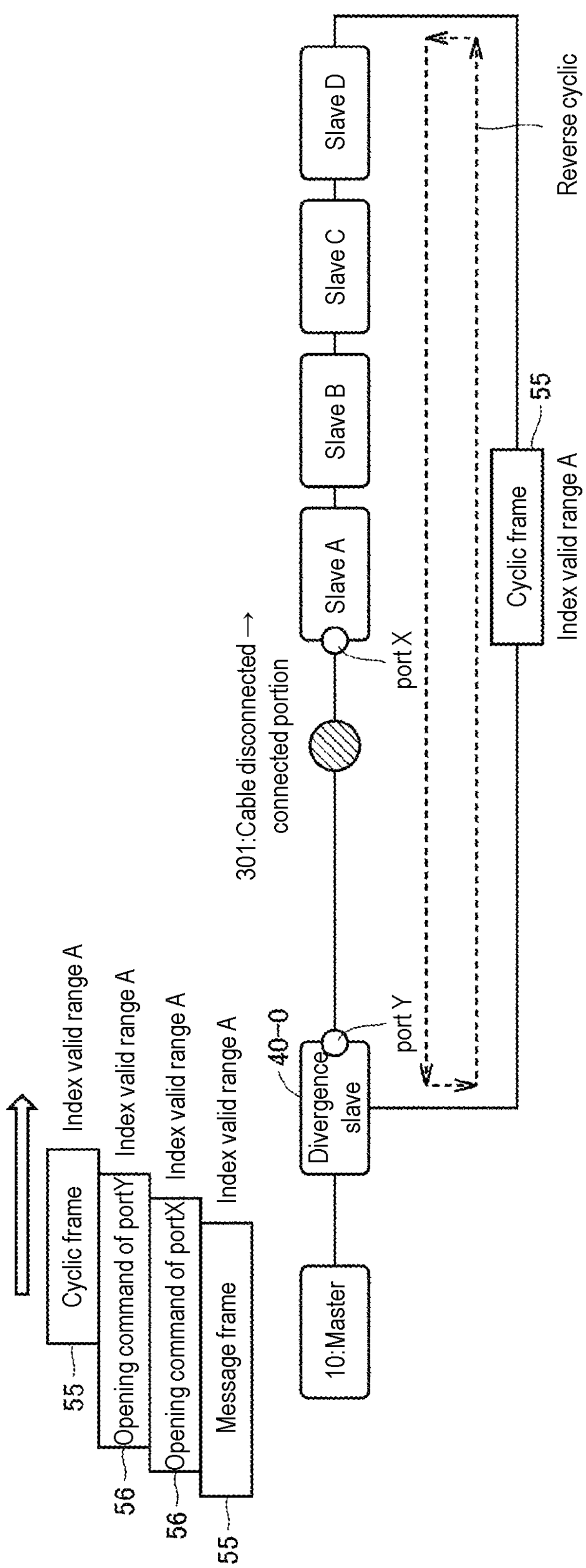
FIG. 29 is a diagram schematically illustrating another flow of the frame according to the embodiment.
Figure 30:
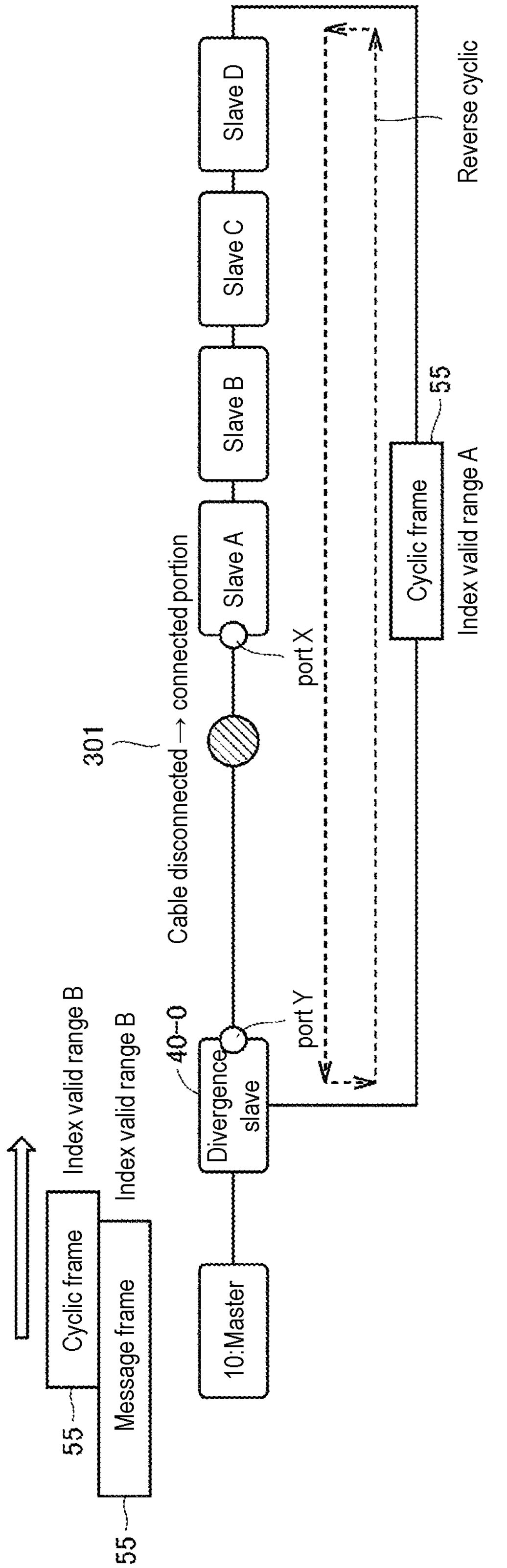
FIG. 30 is a diagram schematically illustrating still another flow of the frame according to the embodiment.
Figure 31:
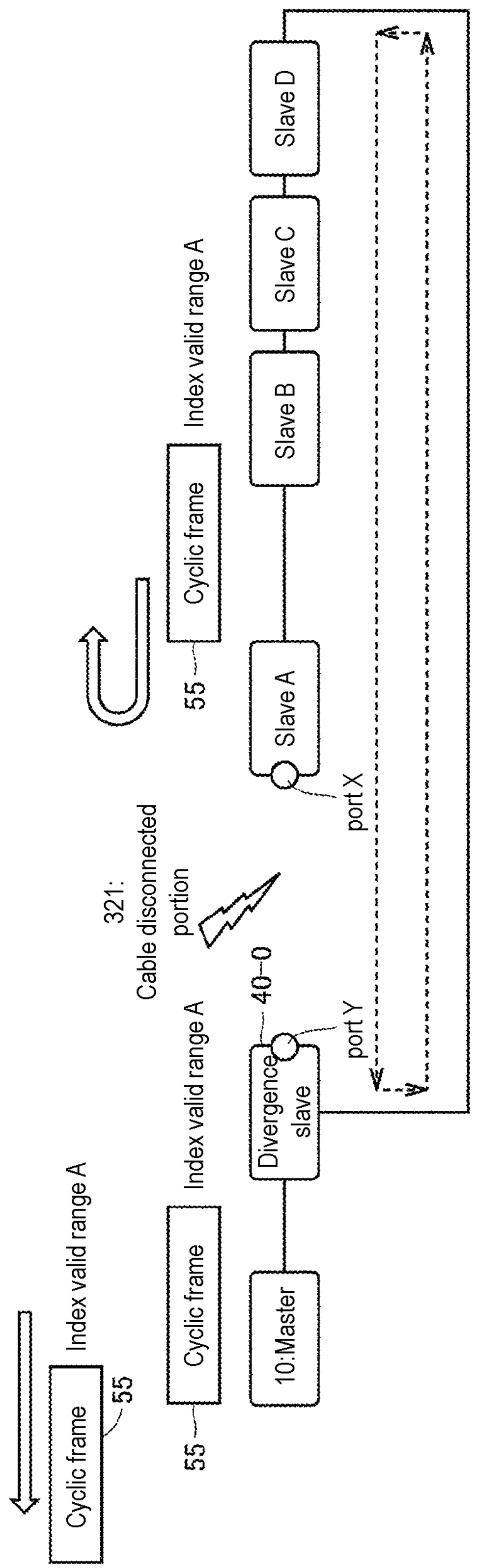
FIG. 31 is a diagram schematically illustrating still another flow of the frame according to the embodiment.
Figure 32:
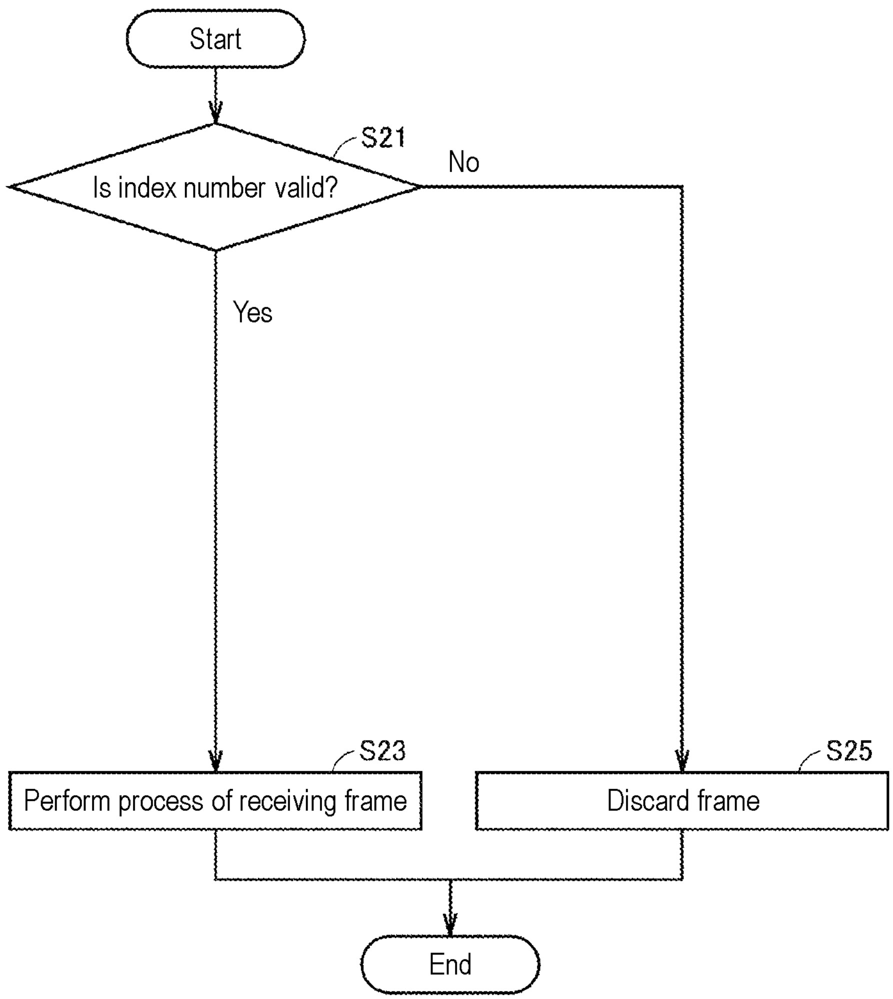
FIG. 32 is a diagram illustrating an example of a flowchart of a process of a frame discarding part according to the embodiment.

A method in which the master 10 numbers a value (number) of the index 53 to detect an arriving reverse cyclic frame will be described. This method can be applied to both (case 1) and (case 2). FIG. 27 is a diagram schematically illustrating still another example of the functional configuration of the master 10 according to the embodiment. Referring to FIG. 27, the master 10 includes a generation setting part 190 and a frame discarding part 191 in addition to the configuration of FIG. 7. FIG. 28 is a diagram illustrating a process of the generation setting part 190 according to the embodiment. FIGS. 29 to 31 are diagrams schematically illustrating another flow of the frame according to the embodiment. FIG. 32 is a diagram illustrating an example of a flowchart of a process of the frame discarding part 191.

In the embodiment, the master 10 sets the index 53 for managing a generation of the frame 50 to be sent out at each predetermined period when the frame 50 is sent out to the network 4 of the ring topology at each predetermined period based on a predetermined period, for example, a control period. Specifically, the generation setting part 190 sets the index 53 for managing the generation in the header 51 of the frame 50 (the command frame 56 or the cyclic frame 55 at the normal time) accepted from the cyclic suppression part 180 or the frame processing part 188 by the communication processing part 186. The communication processing part 186 sends out the frame 50 in which the index 53 is set to the network 4 of the ring topology.

Referring to FIG. 28, the generation setting part 190 increases the value within a valid range 291 of the index number while synchronizing with an output of the timer 115 and sets the increased value in the index 53. The valid range 291 can be divided into a plurality of specific valid ranges 293. The generation setting part 190 increases the value of the index 53 within the specific valid range 293 at each predetermined period. Thus, the index 53 indicating values of the different valid ranges 293 at each predetermined period, that is, the generation, is allocated to the frame 50 which is sent out to the network 4 of the ring topology.

For example, when the generation setting part 190 increases the value within a range of 0 to 1022 at each predetermined period and the command frame 56 is output from the port control part 1810, the generation setting part 190 changes the valid range 293 from a subsequent predetermined period, that is, changes the generation allocated to the cyclic frame 55, to detect the cyclic frame (step S292 of FIG. 28). For example, when the index 53 in which the valid range 293 is increased to "0 to 1022" is allocated to the frame 50 and the command frame 56 is output, the generation setting part 190 changes the valid range 293 from present "0 to 1022" to "1023 to 2046" from a subsequent predetermined period. Accordingly, whenever the command frame 56 is sent out, the frame to be sent out at the subsequent predetermined period is switched to a frame of a subsequent generation.

Detection of the reverse cyclic frame will be described with reference to a flow of a frame in FIGS. 29 to 31. When the master 10 transmits the cyclic frame 55 at the normal time in which the valid range 293 at a certain predetermined period is "A" (for example, 0 to 1022) and a path between the portY of the divergence slave 40-0 and the portX of the slave "A" is disconnected meanwhile, the cyclic frame 55 at the normal time is looped back in the disconnected portion. When a path disconnection 301 in FIG. 30 is detected, the port control part 1810 in the master 10 sequentially transmits the command frame 56 of the opening command 54 of the portY and the command frame 56 of the opening command 54 of the portX and continuously transmits the cyclic frame 55 of the message (see FIG. 29). In this case, when the command frame 56 of the opening command 54 of the portY arrives at the divergence slave 40-0, the portY is opened and the portX is not yet opened. Therefore, the subsequently continued cyclic frame 55 of the message and command frame 56 of the opening command 54 of the portX are transferred in the direction of the divergence slave 40-0, the slave "D," the slave "C," the slave "B," and the slave "A." When the command frame 56 of the opening command 54 of the portX arrives at the slave "A," the opening command 54 of the portX in the slave "A" is executed and the portX is opened. Thus, the looped-back command frame 56 of the valid range "A" starts to be reversely circulated in the ring topology (see FIG. 29).

In the master 10, the generation setting part 190 changes the valid range 293 of the index 53 of the frame 50 to be sent out to the network 4 of the ring topology from the subsequent predetermined period from "A" to "B" in response to an output of the command frame 56 from the port control part 1810 (see FIG. 30). Thereafter, the master 10 sends out the frame 50 of the index 53 indicating that the valid range 293 is "B" to the network 4 of the ring topology.

As indicated by a cable-disconnected portion 321 in FIG. 31, when the path is disconnected again, the reversely circulated frame 50 with the index 53 indicating that the valid range 293 is "A" is looped back in the disconnected portion and arrives at the master 10 (see FIG. 31). At this time, the frame discarding part 191 performs a process of discarding the frame in FIG. 32.

Referring to FIG. 32, the frame discarding part 191 compares the value of the index 53 of the frame 50 accepted from the network 4 of the ring topology via the communication processing part 186 with the value of the present valid range 293 indicated by the generation setting part 190 and determines whether the value of the index 53 of the frame 50 is valid based on a comparison result (step S21).

In the case of FIG. 31, while the index 53 of the frame 50 accepted to the master 10 indicates the value of "A" of the valid range 293, the present valid range 293 indicated by the generation setting part 190 is the value of "B." Accordingly, the frame discarding part 191 determines that the index 53 is not valid based on the fact that the value of the index 53 of the frame 50 does not correspond to the present valid range 293 (NO in step S21) and discard the frame 50 so that the frame 50 is not output to the frame processing part 188 (step S25).

Conversely, when the frame discarding part 191 determines that the index 53 is valid based on the fact that the value of the index 53 of the frame 50 accepted to the master 10 corresponds to the present valid range 293 (YES in step S21), the frame discarding part 191 does not discard the frame 50. Accordingly, the frame processing part 188 performs a process of receiving the frame 50 accepted to the master 10 (step S23).

The generation setting part 190 and the frame discarding part 191 can detect (extract) only the frame in which the index 53 of the frame 50 does not correspond to the present valid range 293 among the frames 50 accepted from the network 4 of the ring topology to the master 10, that is, the reverse cyclic frame, and can discard the detected reverse cyclic frame.

The detection of the cyclic frame in which the generation (the index 53) set by the generation setting part 190 is used may be performed in combination with the detection of the cyclic frame in which the RoundTripBit 57 set by the bit setting part 460 is used.

<H. Notification of Occurrence of Cyclic Frame>

In the embodiment, the notifying part 1871 outputs a notification indicating that a reverse cyclic frame is likely to occur due to a change from the loopback transfer to the cyclic transfer. For example, when the master 10 detects frame losing in the ring topology, the notifying part 1871 outputs the notification.

Specifically, the communication processing part 186 detects frame losing based on the index 53 of the frame 50 received from the network 4 of the ring topology. The communication processing part 186 combines the value of the index 53 of the frame 50 sent out to the network 4 of the ring topology with the value of the index 53 of the frame 50 accepted from the network 4 of the ring topology. When the value of the index 53 of the frame 50 accepted at each predetermined period matches the value of the index 53 of the frame 50 sent out at the predetermined period based on a comparison result, the communication processing part 186 determines that all the sent frames 50 are returned to the master 10. Conversely, when the value of the index 53 of the frame 50 accepted at the predetermined period does not match the value of the index of the frame 50 sent out at the predetermined period, the communication processing part 186 determines that all the sent frames 50 are not returned to the master 10. That is, it is detected that the frame losing occurs. One of the reasons for the frame losing is occurrence of a reverse cyclic frame. Accordingly, when occurrence of frame losing is detected, the notifying part 1871 generates a notification indicating a possibility of a reverse cyclic frame occurring and outputs the generated notification to the support device 200 via the communication processing part 187.

Figure 33:
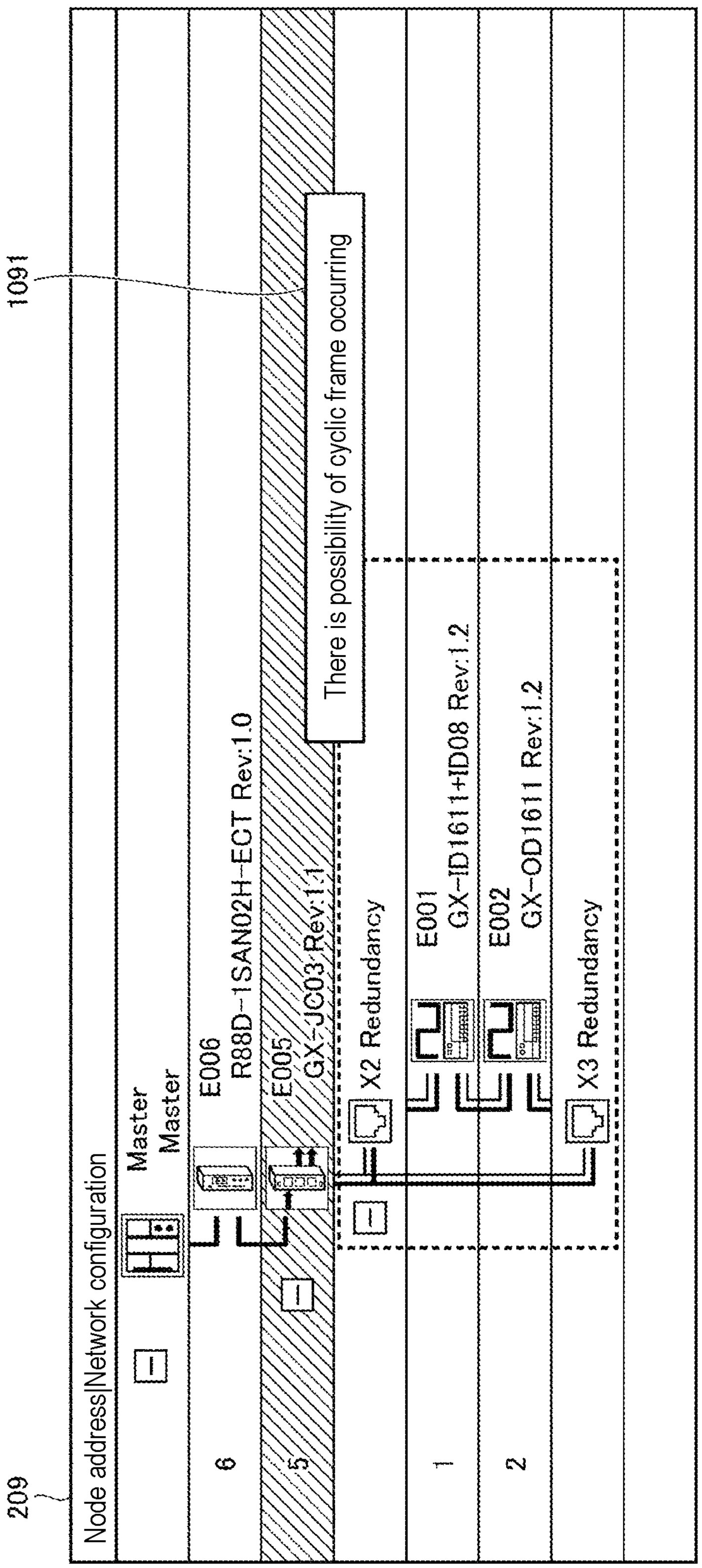
FIG. 33 is a diagram illustrating an example of a screen displayed by a support device according to the embodiment.

FIG. 33 is a diagram illustrating an example of a screen displayed by the support device 200 according to the embodiment. The screen of FIG. 33 is based on a notification from the notifying part 1871. When the notification is received from the notifying part 1871, the support device 200 outputs a notification indicating a possibility of a reverse cyclic frame occurring to the display 209 or the like using a system definition variable. In FIG. 33, a message 1091 which indicates "there is a possibility of a cyclic frame occurring" and is based on the notification is displayed in association with an image representing a network configuration including the ring topology based on the network configuration information 1851.

On the screen of FIG. 33, a mark presenting a portion in which a path is disconnected may be displayed based on an output of the connection state detection part 1822 in the image of the network configuration of the ring topology.

A method of detecting occurrence of a reverse cyclic frame is not limited to the method based on detection of occurrence of frame losing, but may be a method based on discarding of a frame by the frame discarding part 189 or 191.

<I. Supplements>

The above-described embodiments contain the following technical ideas.

[Configuration 1]

A master device (10) that manages a plurality of slave devices (40) connected to a ring wiring (4), wherein the plurality of slave devices include a first slave device (40-0) constituting a start point and an end point of the ring wiring and a plurality of second slave devices (40-1, 40-2, 40-3, 40-4) connected between the start point and the end point of the first slave device, wherein the ring wiring is capable of configuring a first path (15) via which each of the second slave devices receives data (50) accepted from a start point side and cyclically transfers the accepted data to an end point side and a second path (16) via which each of the plurality of slave devices loops back the data from the self-slave device when a path between the self-slave device and an adjacent slave device is disconnected, wherein the master device comprises an instruction means (1810) for transmitting an instruction (56) to switch the second path to the first path to the slave device performing the loopback when the path is recovered from the disconnection, and wherein the master device sends out (1824) data to the ring wiring after elapse of a time based on a propagation delay time of the ring wiring from the time of the transmission of the instruction.

[Configuration 2]

The master device according to Configuration 1, wherein each of the slave devices has a first port (410) and a second port (420) to which a path connected to an adjacent slave device is connected, wherein, when the first path is configured, each of the second slave devices receives the data accepted from the start point side with the first port and transfers the accepted data from the second port to the end point side, wherein the instruction includes an opening instruction (54, 59) for enabling data to be received from the detected first port and an opening instruction (54, 59) for enabling data to be received from the second port, and wherein the instruction means differently sets a transmission order of the opening instruction of the first port and the opening instruction of the second port in accordance with a position of the disconnected path on the ring wiring.

[Configuration 3]

The master device according to Configuration 2, further including:

a means (1822) for detecting the first port and the second port of a slave device to which a disconnected path is connected based on communication between the master device and the plurality of slave devices.

[Configuration 4]

The master device according to Configuration 2 or 3, wherein the data includes a code (57) indicating whether the data is changed from the loopback to the cyclic transfer, and wherein the master device detects data of which the code indicates the change among pieces of data accepted from the ring wiring and discards (189) the detected data.

[Configuration 5]

The master device according to any one of Configurations 2 to 4, wherein the master device sends out data to the ring wiring while allocating a generation (293) to the data, wherein, when the instruction is transmitted, the master device subsequently changes the generation allocated to the data from a generation allocated before the transmission of the instruction, and wherein the master device detects data allocated with a generation different from the generation currently allocated to data among pieces of data accepted from the ring wiring and discards (191) the detected data.

[Configuration 6]

The master device according to any one of Configurations 2 to 5, wherein the master device outputs (1871) a notification indicating that a change in data from loopback transfer to cyclic transfer occurs.

[Configuration 7]

The master device according to any one of Configurations 1 to 6, wherein the ring wiring includes an EtherCAT network.

[Configuration 8]

An arithmetic processing device including the master device according to any one of Configurations 1 to 7.

[Configuration 9]

A programmable logic controller including the arithmetic processing device according to Configuration 8.

[Configuration 10]

A network including a ring wiring (4), the network including:

a plurality of slave devices (40) connected to the ring wiring; and a master device (10) configured to manage the plurality of slave devices, wherein the plurality of slave devices include a first slave device (40-0) constituting a start point and an end point of the ring wiring and a plurality of second slave devices (40-1, 40-2, 40-3, 40-4) connected between the start point and the end point of the first slave device, wherein the ring wiring is capable of configuring a first path (15) via which each of the second slave devices receives data accepted from a start point side and cyclically transfers the accepted data to an end point side and a second path (16) via which each of the plurality of slave devices loops back the data from the self-slave device when a path between the self-slave device and an adjacent slave device is disconnected, wherein the master device includes an instruction means (1810) for transmitting an instruction (56) to switch the second path to the first path to the slave device performing the loopback when the path is recovered from the disconnection, and wherein the master device sends out (1824) data to the ring wiring after elapse of a time based on a propagation delay time of the ring wiring from the time of the transmission of the instruction.

[Configuration 11]

A method performed by a master device (10) that manages a plurality of slave devices (40) connected to a ring wiring (4), wherein the plurality of slave devices include a first slave device (40-0) constituting a start point and an end point of the ring wiring and a plurality of second slave devices (40-1, 40-2, 40-3, 40-4) connected between the start point and the end point of the first slave device, wherein the ring wiring is capable of configuring a first path (15) via which each of the second slave devices receives data accepted from a start point side and cyclically transfers the accepted data to an end point side and a second path (16) via which each of the plurality of slave devices loops back the data from the self-slave device when a path between the self-slave device and an adjacent slave device is disconnected, and wherein the method comprising:

a step (S5, S4) of transmitting an instruction (56) to switch the second path to the first path to the slave device performing the loopback when the path is recovered from the disconnection; and a step (S6, S7) of sending out data to the ring wiring after elapse of a time based on a propagation delay time of the ring wiring from the time of the transmission of the instruction.

The embodiments disclosed above are exemplary in all the respects and are not considered to be limited. The scope of the present invention is indicated in the claims rather than the foregoing description of the embodiment and is intended to include equivalent meanings to those of the claims and all the changes in the scope.

What is claimed is:

1. A network including a ring wiring, the network comprising:

a plurality of slave devices connected to the ring wiring; and a master device configured to manage the plurality of slave devices, wherein the plurality of slave devices include a first slave device constituting a start point and an end point of the ring wiring and a plurality of second slave devices connected between the start point and the end point of the first slave device, wherein the ring wiring is capable of configuring a first path via which each of the second slave devices receives data accepted from a start point side and cyclically transfers the accepted data to an end point side and a second path via which each of the plurality of slave devices loops back the data from the self-slave device when a path between the self-slave device and an adjacent slave device is disconnected, wherein each of the slave devices has a first port and a second port to which a path connected to an adjacent slave device is connected, wherein, when the first path is configured, each of the second slave devices receives the data accepted from the start point side with the first port and transfers the accepted data from the second port to the end point side, wherein the master device is further configured to:

transmit an instruction to switch the second path to the first path to the slave device performing the loopback when the path is recovered from the disconnection, wherein the instruction includes an opening instruction for enabling data to be received from the detected first port and an opening instruction for enabling data to be received from the second port, and the master device differently sets a transmission order of the opening instruction of the first port and the opening instruction of the second port in accordance with a position of the disconnected path on the ring wiring;

send out data to the ring wiring after elapse of a time based on a propagation delay time of the ring wiring from the time of the transmission of the instruction, wherein the data includes a code indicating whether the data is changed from the loopback to the cyclic transfer; and detect data of which the code indicates the change among pieces of data accepted from the ring wiring and discard the detected data.

2. The network according to claim 1, further comprising:

a means for detecting the first port and the second port of a slave device to which a disconnected path is connected based on communication between the master device and the plurality of slave devices.

3. The network according to claim 2, wherein the data includes a code indicating whether the data is changed from the loopback to the cyclic transfer, and wherein the master device detects data of which the code indicates the change among pieces of data accepted from the ring wiring and discards the detected data.

4. The network according to claim 2, wherein the master device sends out data to the ring wiring while allocating a generation to the data which is sent out from the master device to the ring wiring, wherein, when the instruction is transmitted, the master device subsequently changes the generation allocated to the data from a generation allocated before the transmission of the instruction, and wherein the master device detects data allocated with a generation different from the generation currently allocated to data among pieces of data accepted from the ring wiring and discards the detected data.

5. The network according to claim 2, wherein the master device outputs a notification indicating that a change in data from loopback transfer to cyclic transfer occurs.

6. The network according to claim 2, wherein the ring wiring includes an EtherCAT network.

7. The network according to claim 1, wherein the master device sends out data to the ring wiring while allocating a generation to the data which is sent out from the master device to the ring wiring, wherein, when the instruction is transmitted, the master device subsequently changes the generation allocated to the data from a generation allocated before the transmission of the instruction, and wherein the master device detects data allocated with a generation different from the generation currently allocated to data among pieces of data accepted from the ring wiring and discards the detected data.

8. The network according to claim 7, wherein the master device outputs a notification indicating that a change in data from loopback transfer to cyclic transfer occurs.

9. The network according to claim 1, wherein the master device outputs a notification indicating that a change in data from loopback transfer to cyclic transfer occurs.

10. The network according to claim 1, wherein the ring wiring includes an EtherCAT network.

11. An arithmetic processing device comprising a master device configured to manage a plurality of slave devices connected to a ring wiring that is included in a network comprising the master device and the plurality of slave devices, wherein the plurality of slave devices include a first slave device constituting a start point and an end point of the ring wiring and a plurality of second slave devices connected between the start point and the end point of the first slave device, wherein the ring wiring is capable of configuring a first path via which each of the second slave devices receives data accepted from a start point side and cyclically transfers the accepted data to an end point side and a second path via which each of the plurality of slave devices loops back the data from the self-slave device when a path between the self-slave device and an adjacent slave device is disconnected, wherein each of the slave devices has a first port and a second port to which a path connected to an adjacent slave device is connected, wherein, when the first path is configured, each of the second slave devices receives the data accepted from the start point side with the first port and transfers the accepted data from the second port to the end point side, wherein the master device is further configured to:

transmit an instruction to switch the second path to the first path to the slave device performing the loopback when the path is recovered from the disconnection, wherein the instruction includes an opening instruction for enabling data to be received from the detected first port and an opening instruction for enabling data to be received from the second port, and the master device differently sets a transmission order of the opening instruction of the first port and the opening instruction of the second port in accordance with a position of the disconnected path on the ring wiring;

send out data to the ring wiring after elapse of a time based on a propagation delay time of the ring wiring from the time of the transmission of the instruction, wherein the data includes a code indicating whether the data is changed from the loopback to the cyclic transfer; and detect data of which the code indicates the change among pieces of data accepted from the ring wiring and discard the detected data.

12. A programmable logic controller comprising the arithmetic processing device according to claim 11.

13. A method performed by a master device configured to manage a plurality of slave devices connected to a ring wiring that is included in a network comprising the master device and the plurality of slave devices, wherein the plurality of slave devices include a first slave device constituting a start point and an end point of the ring wiring and a plurality of second slave devices connected between the start point and the end point of the first slave device, wherein the ring wiring is capable of configuring a first path via which each of the second slave devices receives data accepted from a start point side and cyclically transfers the accepted data to an end point side and a second path via which each of the plurality of slave devices loops back the data from the self-slave device when a path between the self-slave device and an adjacent slave device is disconnected, wherein each of the slave devices has a first port and a second port to which a path connected to an adjacent slave device is connected, wherein, when the first path is configured, each of the second slave devices receives the data accepted from the start point side with the first port and transfers the accepted data from the second port to the end point side, and wherein the method comprises:

a step of transmitting an instruction to switch the second path to the first path to the slave device performing the loopback when the path is recovered from the disconnection, wherein the instruction includes an opening instruction for enabling data to be received from the detected first port and an opening instruction for enabling data to be received from the second port, and the master device differently sets a transmission order of the opening instruction of the first port and the opening instruction of the second port in accordance with a position of the disconnected path on the ring wiring;

a step of sending out data to the ring wiring after elapse of a time based on a propagation delay time of the ring wiring from the time of the transmission of the instruction, wherein the data includes a code indicating whether the data is changed from the loopback to the cyclic transfer; and a step of detecting data of which the code indicates the change among pieces of data accepted from the ring wiring and discarding the detected data.

* * * * *